(12) United States Patent
Higuchi et al.

(10) Patent No.: US 8,869,214 B2
(45) Date of Patent: Oct. 21, 2014

(54) DEVICE CONTROL APPARATUS, DEVICE CONTROL METHOD AND COMPUTER PROGRAM

(75) Inventors: Satoshi Higuchi, Kanagawa (JP); Koichi Tashiro, Tokyo (JP); Ken Onogi, Tokyo (JP); Keisuke Satou, Kanagawa (JP)

(73) Assignee: Sony Corporation (JP)

( * ) Notice: Subject to any disclaimer, the term of this patent is extended or adjusted under 35 U.S.C. 154(b) by 218 days.

(21) Appl. No.: 12/928,982

(22) Filed: Dec. 23, 2010

(65) Prior Publication Data

US 2011/0167465 A1    Jul. 7, 2011

(30) Foreign Application Priority Data

Jan. 4, 2010   (JP) ............................... P2010-000248

(51) Int. Cl.
| | |
|---|---|
| *H04N 7/18* | (2006.01) |
| *H04N 5/775* | (2006.01) |
| *G09G 5/00* | (2006.01) |
| *H04N 21/436* | (2011.01) |
| *H04N 21/422* | (2011.01) |
| *H04N 21/41* | (2011.01) |
| *H04N 21/4363* | (2011.01) |
| *H04N 5/85* | (2006.01) |
| *H04N 5/781* | (2006.01) |

(52) U.S. Cl.
CPC ............... *G09G 5/006* (2013.01); *H04N 5/775* (2013.01); *H04N 5/85* (2013.01); *H04N 21/43622* (2013.01); *H04N 21/42204* (2013.01); *H04N 5/781* (2013.01); *H04N 21/4122* (2013.01); *H04N 21/43635* (2013.01)
USPC .......................................................... 725/80

(58) Field of Classification Search
CPC ................... H04N 21/43615; H04N 21/43635
USPC ..................... 725/117, 80; 348/734
See application file for complete search history.

(56) References Cited

U.S. PATENT DOCUMENTS

2002/0078447 A1* 6/2002 Mizutome et al. ............... 725/37
2007/0077020 A1* 4/2007 Takahama ......................... 386/1

(Continued)

FOREIGN PATENT DOCUMENTS

| JP | 2008-035399 A | 2/2008 |
|---|---|---|
| WO | 2008-093780 A1 | 8/2008 |

OTHER PUBLICATIONS

High-Definition Multimedia Interface Specification Version 1.3, Jun. 22, 2006, pp. ii-153 and Supplement 1 Consumer Electronics Control (CEC), pp. ii-62.

*Primary Examiner* — Benjamin R Bruckart
*Assistant Examiner* — Aklil Tesfaye
(74) *Attorney, Agent, or Firm* — Lerner, David, Littenberg, Krumholz & Mentlik, LLP

(57) ABSTRACT

There is provided a device control apparatus including a transmission signal input/output unit for receiving a signal including a control signal for controlling an internal state from another device or outputting the signal to the other device, an application acquisition unit for properly accessing an application server over a network and properly acquiring the application, a display control unit for controlling a display based on the application acquired by the application acquisition unit, and an operation control unit for executing the application acquired by the application acquisition unit and controlling an operation of the other device connected to the transmission signal input/output unit. The operation control unit permits the other device to transmit its status upon initiation of the execution of the application acquired by the application acquisition unit, and prohibits the other device from transmitting the status upon termination of the application execution.

15 Claims, 31 Drawing Sheets

(56) References Cited

U.S. PATENT DOCUMENTS

| | | | |
|---|---|---|---|
| 2008/0068504 A1* | 3/2008 | Shimizu | 348/565 |
| 2009/0046210 A1* | 2/2009 | Sakamoto et al. | 348/738 |
| 2009/0219452 A1* | 9/2009 | Morikawa et al. | 348/734 |
| 2009/0284656 A1* | 11/2009 | Suzuki et al. | 348/554 |
| 2010/0077442 A1* | 3/2010 | Suga | 725/149 |
| 2010/0141845 A1* | 6/2010 | Kikkawa et al. | 348/706 |
| 2010/0177245 A1* | 7/2010 | Ohnuma et al. | 348/563 |
| 2010/0183157 A1* | 7/2010 | Watanabe | 381/17 |

* cited by examiner

FIG. 2

Logical address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

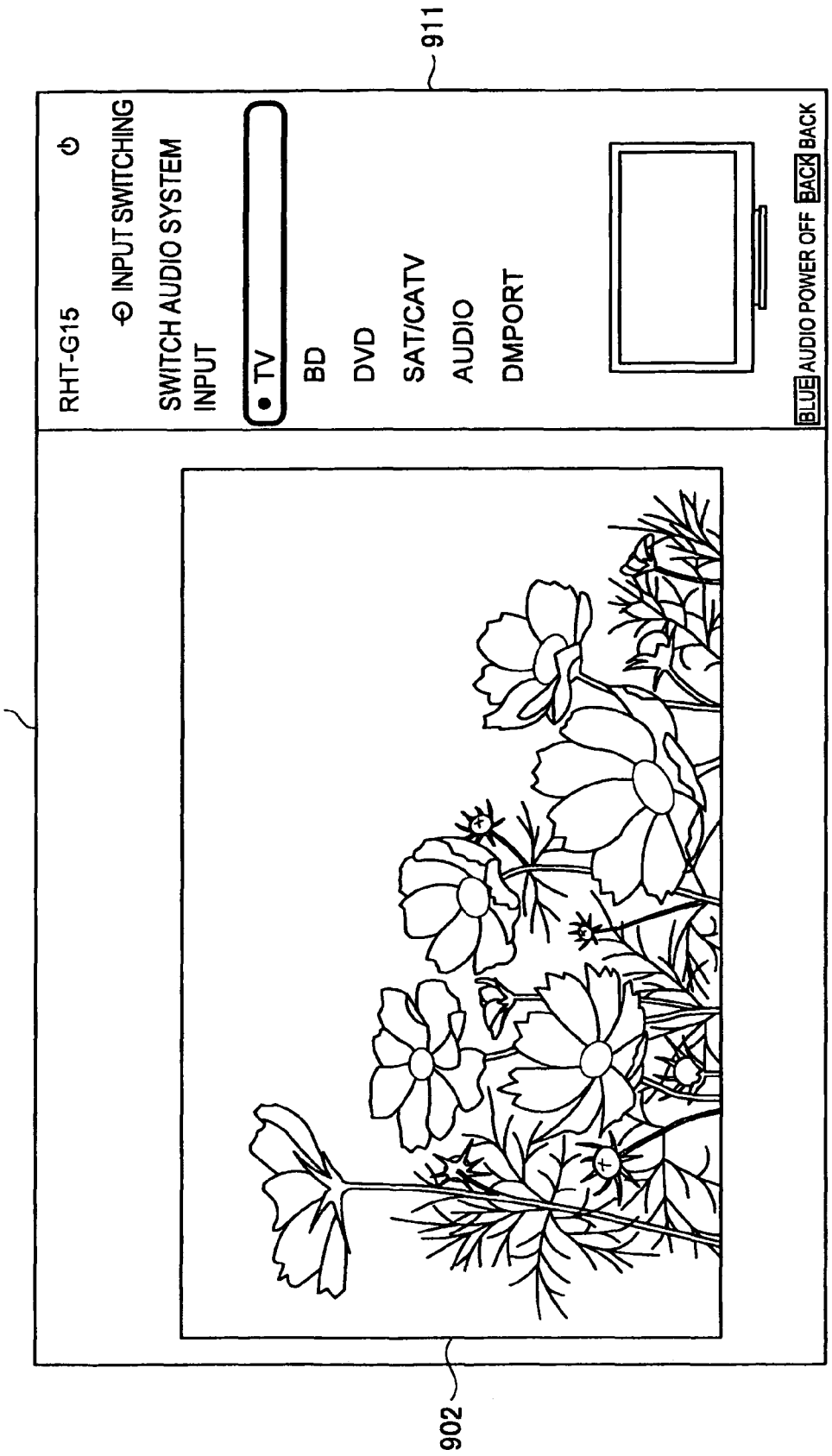

CEC DATA STRUCTURE

HEADER BLOCK DATA STRUCTURE

FIG. 34

| COMMAND TYPE | Opecode | 8TH BYTE | 9TH BYTE | 10TH BYTE |
|---|---|---|---|---|
| TV → REQUEST STATUS FROM AMP | 0x0000 | — | — | — |
| AMP → NOTIFY TV OF STATUS | 0x0001 | Center Level | Subwoofer Level | Front L Level |
| TV → COMMAND TO SET TO AMP | 0x0002 | Center Level | Subwoofer Level | Front L Level |

| COMMAND TYPE | 11TH BYTE | 12TH BYTE | 13TH BYTE |
|---|---|---|---|
| TV → REQUEST STATUS FROM AMP | — | — | — |
| AMP → NOTIFY TV OF STATUS | Front R Level | Surr Lch Level | Surr Rch Level |
| TV → COMMAND TO SET TO AMP | Front R Level | Surr Lch Level | Surr Rch Level |

| COMMAND TYPE | 14TH BYTE | 15TH BYTE | 16TH BYTE |
|---|---|---|---|
| TV → REQUEST STATUS FROM AMP | — | — | — |
| AMP → NOTIFY TV OF STATUS | — | — | — |
| TV → COMMAND TO SET TO AMP | — | — | — |

FIG. 35

| COMMAND TYPE | Opcode | 8TH BYTE | 9TH BYTE | 10TH BYTE |
|---|---|---|---|---|
| TV → REQUEST STATUS FROM AMP | 0x0003 | — | — | — |
| AMP → NOTIFY TV OF STATUS | 0x0004 | SET VALUE a | SET VALUE b | SET VALUE c |
| TV → COMMAND TO SET TO AMP | 0x0005 | SET VALUE a | SET VALUE b | SET VALUE c |

| COMMAND TYPE | 11TH BYTE | 12TH BYTE | 13TH BYTE |
|---|---|---|---|
| TV → REQUEST STATUS FROM AMP | — | — | — |
| AMP → NOTIFY TV OF STATUS | — | — | — |
| TV → COMMAND TO SET TO AMP | — | — | — |

| COMMAND TYPE | 14TH BYTE | 15TH BYTE | 16TH BYTE |
|---|---|---|---|
| TV → REQUEST STATUS FROM AMP | — | — | — |
| AMP → NOTIFY TV OF STATUS | — | — | — |
| TV → COMMAND TO SET TO AMP | — | — | — |

DEVICE CONTROL APPARATUS, DEVICE CONTROL METHOD AND COMPUTER PROGRAM

CROSS-REFERENCE TO RELATED APPLICATION

The present application claims priority from Japanese Patent Application No. JP 2010-000248 filed in the Japanese Patent Office on Jan. 4, 2010, the entire content of which is incorporated herein by reference.

BACKGROUND OF THE INVENTION

1. Field of the Invention

The present invention relates to a device control apparatus, a device control method and a computer program, and more particularly, to a device control apparatus, a device control method and a computer program that control operations unique to other devices using a digital interface for signal transmission.

2. Description of the Related Art

A high definition multimedia interface (HDMI) has been widely used as a digital interface for transmission of a video signal and an audio signal. The HDMI is a digital visual interface (DVI) standard, which is a connection standard of a personal computer (PC) and a display, with an audio transmission function or a copyright protection function for audio visual (AV) devices. The HDMI standard is described in detail in the High-Definition Multimedia Interface Specification Version 1.3.

An HDMI standard interface is capable of bidirectional transmission of a control signal. Accordingly, for example, a television receiver can transmit a control signal to an output device such as a set top box (STB) or a video disc player connected via the HDMI cable. The transmission of the control signal from the television receiver enables a user to manipulate an overall AV system using a remote controller of the television receiver. While signals transmitted via a transmission cable conforming to the HDMI standard include a control instruction for controlling devices, as well as a response to the instruction, a signal indicating states of the devices, and the like, the signals are collectively referred to as a control signal in this disclosure.

In the HDMI standard, inter-device control using consumer electronics control (CEC) is defined. The CEC is one transmission line prepared in the HDMI standard, and performs bidirectional data transmission. Using this CEC line, various controls become possible based on unique physical and logical addresses assigned to each device present in an HDMI network. For example, when a user is viewing a digital broadcast using a television receiver, if a video disc player connected via the HDMI cable performs reproduction, the television receiver is automatically switched to an input to which the video disc player is connected. Menus displayed in this video disc player, a power on/off, and the like can be manipulated using the remote controller of a television receiver.

The HDMI standard defines that a maximum of ten devices, including a television receiver, are allowed to be connected. Accordingly, a maximum of nine external devices can be connected to one television receiver. If the nine external devices are connected to the television receiver, any of the devices can be manipulated using a remote controller.

In the HDMI standard, <Active Source> is defined as a CEC message for specifying a device that is displaying a video on a television receiver. According to this definition, for example, when a user manipulates a Play button of a video disc player that is compliant with the HDMI standard, the video disc player outputs an AV stream if the player is in a state in which the player can output a stable video signal (i.e., an active state). Further, the video disc player broadcasts an <Active Source> message indicating that the video disc player is an active device.

Here, "broadcast" refers to simultaneous transmission of a signal whose transmission destinations are all devices rather than a specific device. The television receiver and other external devices to which the <Active Source> message is broadcast switch a path to reproduce AV streams output from the video player.

Thus, the HDMI standard defines that a device that initiates a display of a video in a television receiver broadcasts an <Active Source> message to other devices in a network. Further, the <Active Source> message is one CEC message defined in the HDMI standard.

In a related art, as described in, for example, Japanese Patent Laid-open Publication No. 2008-35399, a function of changing a reproduction sound field according to genre information of an electronic program guide (EPG) obtained in a television receiver has been realized as HDMI-CEC control. Using this function, the EPG genre information flows into the HDMI-CEC line upon initiation of reception of a program to be viewed on the television receiver or upon a change of the program. When an audio player device called, for example, an AV amplifier, receives the genre information flowed into the CEC line, the reproduction sound field is set according to the genre information.

Adjustments such as, when a sports program is viewed, a play mode in which realistic sensation of the sports program is obtained is set, and when a news program is viewed, a play mode in which voice (speaking voice) is easy to listen to is set becomes possible.

SUMMARY OF THE INVENTION

The connection between the television receiver and the audio player device such as the AV amplifier by HDMI standard cable as described above enables a reproduction sound field to be set according to a genre of viewed AV contents.

However, the volume of an audio player device can be adjusted or a television receiver and the audio player device, such as an AV amplifier, can be simultaneously powered off using the remote controller of the television receiver by connecting between the television receiver and the audio player device via a cable conforming to the HDMI standard, but the reproduction sound field of the AV amplifier may not be manually switched using the remote controller of the television receiver while viewing a manipulation screen on the screen of the television receiver. As a means for changing the sound field of the AV amplifier using the remote controller of the television receiver, there is a method by which the television receiver transmits a user control pressed command, which is a CEC message, to the AV amplifier, or a method by which a code for the AV amplifier is output to the remote controller of the television receiver. However, when such a method is used, a user needs to confirm a set state from information displayed on a fluorescent display tube of the AV amplifier and manipulate the AV amplifier based on this information, and operability is problematic. When such a method is not used, the user may manipulate using the remote controller of the AV amplifier to change the sound field of the AV amplifier. Further, the user needs to manipulate while watching the information displayed on the fluorescent display tube of the AV amplifier, not on the screen of the television receiver. In addition, a change of an output level of each speaker or a woofer level, and various settings unique to the AV amplifier may not be performed with a manipulation on the same screen of the television.

A method of executing various manipulations for an AV amplifier on a screen of a television receiver includes a method in which a graphical user interface (GUI) chip is mounted on the AV amplifier and a screen for executing the various manipulations for the AV amplifier is output from the AV amplifier to the television receiver via an HDMI output. However, this method increases hardware cost since the GUI chip is mounted on the AV amplifier. Further, while a GUI can be superimposed on an HDMI output signal, the GUI may not be superimposed in a television method. Accordingly, this method does not enable a user to manipulate the AV amplifier while viewing a screen, and is inefficient.

In light of the foregoing, it is desirable to provide a device control apparatus, a device control method and a computer program, which are novel and improved and capable of properly acquiring an application for controlling an operation unique to another device using a digital interface for signal transmission from a server and controlling the operation unique to the other device using the application.

According to an embodiment of the present invention, there is provided a device control apparatus including a transmission signal input/output unit for receiving a signal including a control signal for controlling an internal state from another device or outputting the signal to the other device, an application acquisition unit for properly accessing an application server over a network and properly acquiring the application, a display control unit for controlling a display based on the application acquired by the application acquisition unit, and an operation control unit for executing the application acquired by the application acquisition unit and controlling an operation of the other device connected to the transmission signal input/output unit. The operation control unit permits the other device to transmit its status upon initiation of the execution of the application acquired by the application acquisition unit, and prohibits the other device from transmitting the status upon termination of the application execution.

The operation control unit may set a plurality of parameters of the other device connected to the transmission signal input/output unit by means of one command transmission.

The command may be transmitted by the operation control unit is a vendor specific command of HDMI-CEC.

The operation control unit may set a real number in a corresponding field of the command when the parameters of the other device connected to the transmission signal input/output unit are changed, and may set a given invalid value in the field of the command when the parameters are not changed.

The operation control unit may execute the application acquired by the application acquisition unit and may power the other device connected to the transmission signal input/output unit off.

The other device connected to the transmission signal input/output unit may be an audio amplification device, and the operation control unit may execute the application acquired by the application acquisition unit to change sound field of the audio amplification device.

The other device connected to the transmission signal input/output unit may be an audio amplification device, at least one speaker may be connected to the audio amplification device, and the operation control unit may execute the application acquired by the application acquisition unit to change a sound output level of the speaker connected to the audio amplification device.

The other device connected to the transmission signal input/output unit may be an audio amplification device, and the operation control unit may execute the application acquired by the application acquisition unit to change an audio input source of the audio amplification device.

The device control apparatus may further include an application discarding unit for discarding the application acquired by the application acquisition unit when the operation control unit terminates the execution of the application.

According to another embodiment of the present invention, there is provided a device control method including the steps of receiving a signal including a control signal for controlling an internal state from another device or outputting the signal to the other device, properly accessing an application server over a network and properly acquiring the application, controlling a display based on the application acquired in the application acquisition step, and executing the application acquired in the application acquisition step to control an operation of the other device, permitting the other device to transmit its status upon initiation of the execution of the application acquired by the application acquisition unit, and prohibiting the other device from transmitting the status upon termination of the application execution.

According to another embodiment of the present invention, there is provided a computer program for causing a computer to execute the steps of receiving a signal including a control signal for controlling an internal state from another device or outputting the signal to the other device, properly accessing an application server over a network and properly acquiring the application, controlling a display based on the application acquired in the application acquisition step, and executing the application acquired in the application acquisition step to control an operation of the other device, permitting the other device to transmit its status upon initiation of the execution of the application acquired by the application acquisition unit, and prohibiting the other device from transmitting the status upon termination of the application execution.

As described above, according to the present invention, it is possible to provide a device control apparatus, a device control method and a computer program, which are novel and improved and capable of properly acquiring an application for controlling an operation unique to another device using a digital interface for signal transmission from a server and controlling the operation unique to the other device using the application.

BRIEF DESCRIPTION OF THE DRAWINGS

FIG. 2 shows a CEC table indicating a correspondence relationship between devices and CEC logical addresses;

FIG. 14A illustrates an example of the screen displayed by the display panel;

FIG. 34 shows a data example of a command; and

FIG. 35 shows a data example of a command.

DETAILED DESCRIPTION OF THE EMBODIMENT(S)

Figure 1:
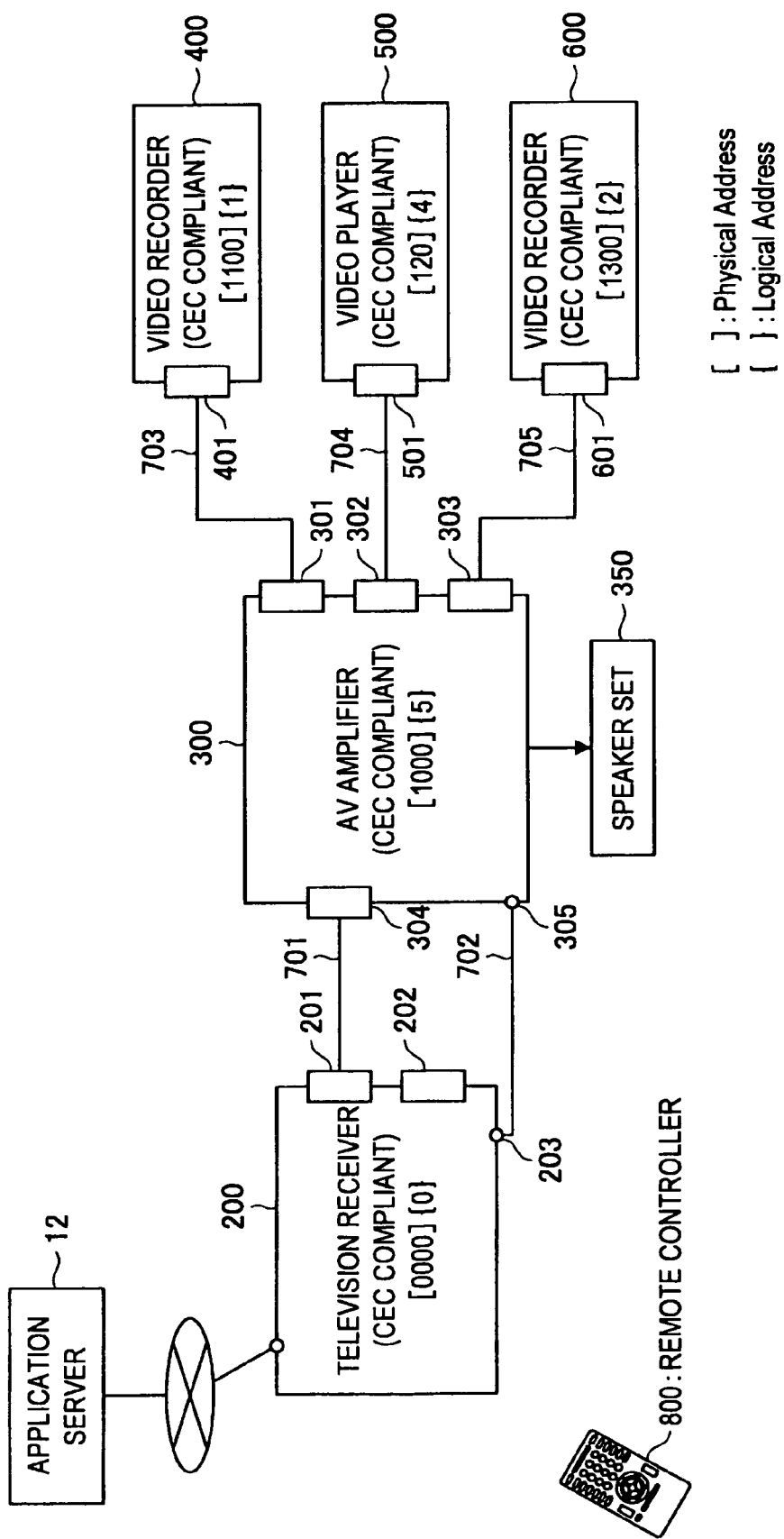
FIG. 1 is a block diagram showing a configuration example of an AV system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.

1. Entire Configuration Example of System [FIGS. 1 and 2]
2. Configuration Example of Television Receiver [FIGS. 3 and 4]
3. Configuration Example of AV Amplifier [FIG. 5]
4. Configuration Example of Application Server [FIG. 6]
5. HDMI Standard Transmission Configuration and Process Example [FIGS. 7 to 9]
6. Operation Example of Television Receiver and AV Amplifier [FIGS. 10 to 35]
7. Conclusion 1. Entire Configuration Example of System [FIGS. 1 and 2]

Hereinafter, an example of an embodiment of the present invention will be described.

FIG. 1 shows a configuration example of an AV system 100 of the present embodiment.

This AV system 100 includes a television receiver 200, an AV amplifier 300, a video recorder 400, a video player 500, and a video recorder 600. The video recorder 400, the video player 500 and the video recorder 600 constitute HDMI source devices. The AV amplifier 300 constitutes an HDMI repeater device. The television receiver 200 constitutes an HDMI sink device. The video recorder 400, the video player 500 and the video recorder 600 are devices that use a video disc such as a DVD or a hard disk as a recording medium and record and reproduce video data (AV contents).

The television receiver 200 is a CEC compliant device, and includes HDMI terminals 201 and 202, an optical output terminal 203, and a network terminal 236. The television receiver 200 has a configuration that can be remotely controlled by a remote controller 800. The television receiver 200 has a function of properly acquiring an application managed by the application server 12 over the network 11, executing a process based on the application and displaying given information, or controlling a device connected to the television receiver 200 at the HDMI terminals 201 and 202.

The application provided from the application server 12 is produced to be executed in a state in which a video is displayed on the television receiver 200. A user of the television receiver 200 can use the contents provided by the application by causing the application provided from the application server 12 to be executed on the television receiver 200 while viewing a broadcast received by the television receiver 200 or contents played by the video player 500.

The video recorder 400 includes a HDMI terminal 401, the video player 500 includes a HDMI terminal 501, and the video recorder 600 includes a HDMI terminal 601, which are all CEC compliant devices.

The AV amplifier 300 is a CEC compliant device, and includes HDMI terminals 301, 302, 303, and 304, and an optical input terminal 305. A speaker set 350 including a plurality of speakers is connected to the AV amplifier 300, and an audio signal reproduced in the AV amplifier 300 is output from the speaker set 350. This speaker set 350 includes speakers located at a front, right front, left front, right rear and left rear of a listener, and a subwoofer speaker for bass output which realizes, for example, 5.1 channel surround. The AV amplifier 300 and each speaker may be separate entities, but, for example, the AV amplifier and the respective speakers (at least front speakers) may be housed in a rack in which a television receiver is placed.

The television receiver 200 and the AV amplifier 300 are connected via an HDMI cable 701 and an optical cable 702. That is, one end of the HDMI cable 701 is connected to the HDMI terminal 201 of the television receiver 200 and the other end thereof is connected to the HDMI terminal 304 of the AV amplifier 300. One end of the optical cable 702 is connected to the optical output terminal 203 of the television receiver 200 and the other end thereof is connected to the optical input terminal 305 of the AV amplifier 300.

The AV amplifier 300 and the video recorder 400 are connected via a HDMI cable 703. That is, one end of the HDMI cable 703 is connected to the HDMI terminal 301 of the AV amplifier 300, and another end is connected to the HDMI terminal 401 of the video recorder 400.

The AV amplifier 300 and the video player 500 are connected via a HDMI cable 704. That is, one end of the HDMI cable 704 is connected to the HDMI terminal 302 of the AV amplifier 300, and another end is connected to the HDMI terminal 501 of the video player 500.

Further, the AV amplifier 300 and the video recorder 600 are connected via a HDMI cable 705. That is, one end of the HDMI cable 705 is connected to the HDMI terminal 303 of the AV amplifier 300, and another end is connected to the HDMI terminal 601 of the video recorder 600.

In the AV system 100 shown in FIG. 1, a physical address and a CEC logical address of each device are acquired, for example, as follows.

That is, when the AV amplifier 300 is connected to the television receiver 200 (the physical address is [0000] and the CEC logical address is {0}) via the HDMI cable 701, the AV amplifier 300 acquires the physical address [1000] from the television receiver 200 using HDMI control protocol.

The CEC compliant device is defined to acquire a logical address upon HDMI connection. The CEC compliant device performs message transmission and reception using this logical address. FIG. 2 shows a table indicating a correspondence relationship between devices and CEC logical addresses. A device "TV" is a device for displaying a video from a television receiver, a projector and the like. A device "recording device" is a recording device such as a hard disk recorder or a DVD recorder. A device "tuner" is a device for receiving AV contents, such as a set top box (STB) that receives a cable television broadcast. A device "playback device" is a player device such as a video player or a camcorder. A device "audio system" is an audio processing device such as an AV amplifier.

The AV amplifier 300 is a CEC compliant device, as described above. The AV amplifier 300 decides a logical address {5} as "audio system" based on the table of FIG. 2. In this case, the AV amplifier 300 recognizes that a device having this logical address {5} is not included in the other devices with a polling message of the CEC control protocol and then decides the logical address {5} as its logical address. The AV amplifier 300 notifies the television receiver 200 that physical address [1000] corresponds to the CEC compliant device {5} by means of a report physical address of the CEC control protocol.

When the video recorder 400 is connected to the AV amplifier 300 via the HDMI cable 703, the video recorder 400 acquires physical address [1100] from the AV amplifier 300 using HDMI control protocol.

The video recorder 400 is the CEC compliant device, as described above. The video recorder 400 decides logical address {1} as a "recording device" based on the table of FIG. 2. In this case, the video recorder 400 recognizes that a device having this logical address {1} is not included in the other devices with a polling message of the CEC control protocol and then decides the logical address {1} as its logical address. The video recorder 400 notifies the television receiver 200 and the AV amplifier 300 that the physical address [1100] corresponds to the CEC compliant device {1} by means of the report physical address of the CEC control protocol.

When the video player 500 is connected to the AV amplifier 300 via an HDMI cable 704, the video player 500 acquires a physical address [1200] from the AV amplifier 300 using the HDMI control protocol.

The video player 500 is the CEC compliant device, as described above. The video player 500 decides a logical address {4} as a "playback device" based on the table of FIG. 2. In this case, the video player 500 recognizes that a device having this logical address {4} is not included in the other devices with a polling message of the CEC control protocol and then decides the logical address {4} as its logical address. The video player 500 notifies the television receiver 200 and the AV amplifier 300 that a physical address [1200] corresponds to a CEC compliant device {4} by means of the report physical address of the CEC control protocol.

When the video recorder 600 is connected to the AV amplifier 300 via an HDMI cable 705, the video recorder 600 acquires a physical address [1300] from the AV amplifier 300 using the HDMI control protocol.

The video recorder 600 is the CEC compliant device, as described above. The video recorder 600 decides a logical address {2} as a "recording device" based on the table of FIG. 2. In this case, the video recorder 600 recognizes that a device having this logical address {2} is not included in the other devices with a polling message of the CEC control protocol and then decides the logical address {2} as its logical address. The video recorder 600 notifies the television receiver 200 and the AV amplifier 300 that the physical address [1300] corresponds to the CEC compliant device {2} by means of the report physical address of the CEC control protocol.

When a program tuned by a tuner of the television receiver 200 is viewed in the AV system 100 shown in FIG. 1, the following operation is executed. That is, a video by a video signal obtained by the tuner is displayed on a display panel (not shown) of the television receiver 200. An audio (sound) by an audio signal obtained by the tuner is output from speakers (not shown) of the television receiver 200 when the AV amplifier 300 is in a system audio mode of OFF. When the system audio mode is on, audio by the audio signal obtained by the tuner is output from the speaker set 350 connected to the AV amplifier 300.

The audio signal obtained by the tuner of the television receiver 200 becomes, for example, an optical digital audio signal and is supplied to the AV amplifier 300 via the optical cable 702. Further, the ON/OFF of the system audio mode in the AV amplifier 300 may be set by the user manipulating a user manipulation unit (not shown) of the AV amplifier 300 or manipulating a user manipulation unit (not shown) of the television receiver 200. Alternatively, the ON/OFF of the system audio mode in the AV amplifier 300 may be set by instructing speaker switching by manipulating the remote controller 800 of the television receiver 200.

In the AV system 100 shown in FIG. 1, when contents reproduced from the disk in the video recorder 400, or a program selected by the tuner, for example, through a switching manipulation from the television receiver 200, a manipulation of a Play button of the video recorder 400, and the like is viewed, the following operation is performed.

That is, the video by the output video signal of the video recorder 400 is displayed on a display panel (not shown) of the television receiver 200. In this case, the output video signal of the video recorder 400 is supplied to the television receiver 200 via the HDMI cable 703, the AV amplifier 300 and the HDMI cable 701.

When the AV amplifier 300 is in a system audio mode of OFF, the audio by the output audio signal of the video recorder 400 is output from a speaker (not shown) of the television receiver 200. In this case, the output audio signal of the video recorder 400 is supplied to the television receiver 200 via the HDMI cable 703, the AV amplifier 300 and the HDMI cable 701.

When the AV amplifier 300 is in the system audio mode of ON, the audio by the output audio signal of the video recorder 400 is output from the speaker set 350 connected to the AV amplifier 300. In this case, the output audio signal of the video recorder 400 is supplied to the AV amplifier 300 via the HDMI cable 703.

In the AV system 100 shown in FIG. 1, when contents reproduced from the disk by the video player 500, for example, through a switching manipulation from the television receiver 200, a manipulation of a Play button of the video player 500, and the like is viewed, the following operation is performed.

That is, a video by the output video signal of the video player 500 is displayed on a display panel (not shown) of the television receiver 200. In this case, the output video signal of the video player 500 is supplied to the television receiver 200 via the HDMI cable 704, the AV amplifier 300 and the HDMI cable 701.

When the AV amplifier 300 is in the system audio mode of OFF, the audio by the output audio signal of the video player 500 is output from the speaker (not shown) of the television receiver 200. In this case, the output audio signal of the video player 500 is supplied to the television receiver 200 via the HDMI cable 704, the AV amplifier 300 and the HDMI cable 701.

When the AV amplifier 300 is in the system audio mode of ON, the audio by the output audio signal of the video player 500 is output from the speaker set 350 connected to the AV amplifier 300. In this case, the output audio signal of the video player 500 is supplied to the AV amplifier 300 via the HDMI cable 704.

In the AV system 100 shown in FIG. 1, when contents reproduced from the disk in the video recorder 600, or a program selected by the tuner, for example, through a switching manipulation from the television receiver 200 is viewed, the following operation is performed.

That is, the video by the output video signal of the video recorder 600 is displayed on a display panel (not shown) of the television receiver 200. In this case, the output video signal of the video recorder 600 is supplied to the television receiver 200 via the HDMI cable 705, the AV amplifier 300 and the HDMI cable 701.

When the AV amplifier 300 is in the system audio mode of OFF, the audio by the output audio signal of the video recorder 600 is output from the speaker (not shown) of the television receiver 200. In this case, the output audio signal of the video recorder 600 is supplied to the television receiver 200 via the HDMI cable 705, the AV amplifier 300 and the HDMI cable 701.

When the AV amplifier 300 is in the system audio mode of ON, the audio by the output audio signal of the video recorder 600 is output from the speaker set 350 connected to the AV amplifier 300. In this case, the output audio signal of the video recorder 600 is supplied to the AV amplifier 300 via the HDMI cable 705.

2. Configuration Example of Television Receiver [FIGS. 3 and 4]

Figure 3:
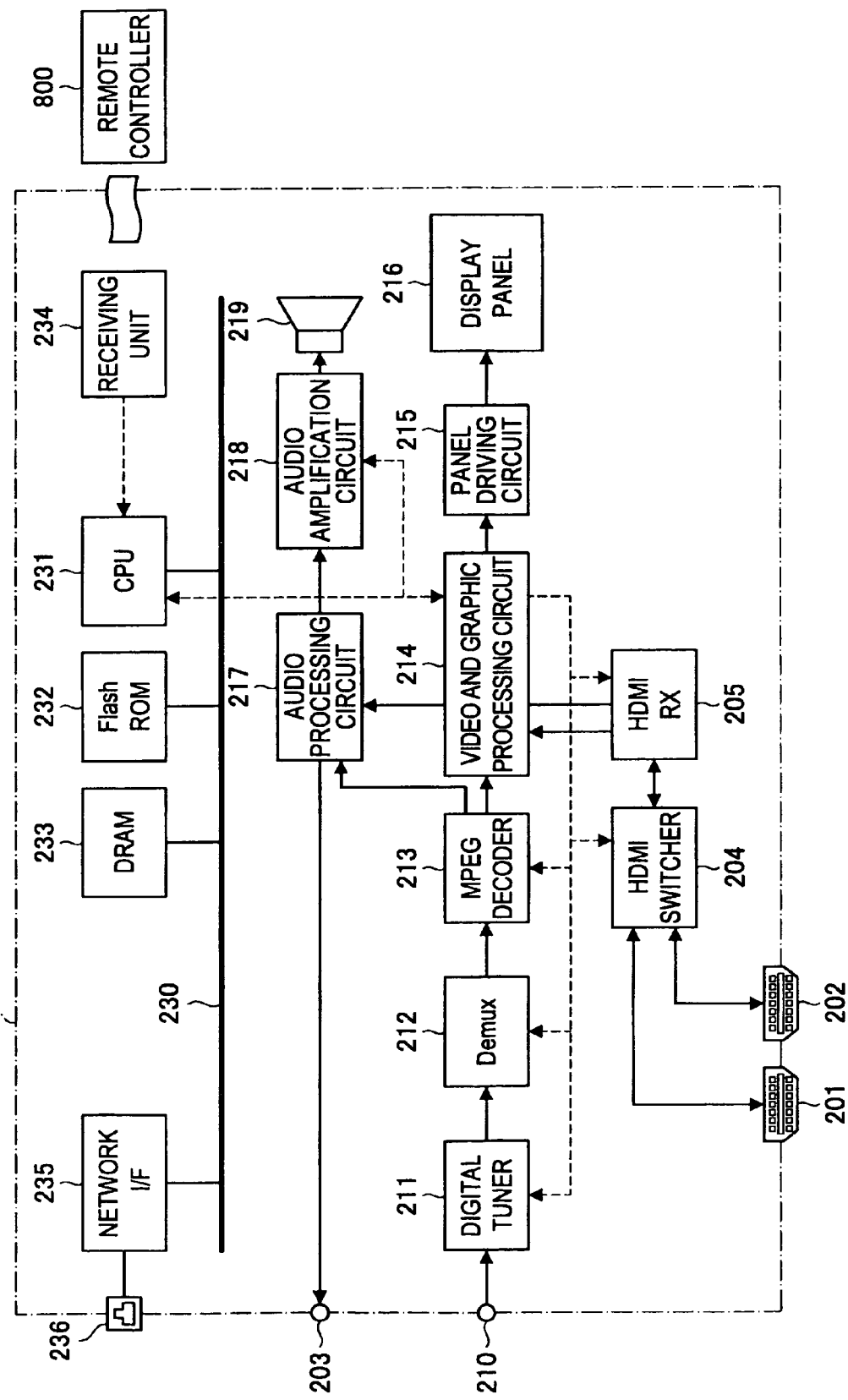
FIG. 3 is a block diagram showing a configuration example of a television receiver (sink device) constituting an AV system according to an embodiment of the present invention.

FIG. 3 shows a configuration example of the television receiver 200 according to an example of the present embodiment. This television receiver 200 includes HDMI terminals 201 and 202, an HDMI switcher 204, an HDMI receiving unit 205, an antenna terminal 210, and a digital tuner 211. The television receiver 200 further includes a demultiplexer (Demux) 212, a Moving Picture Experts Group (MPEG) decoder 213, a video and graphic processing circuit 214, a panel driving circuit 215, and a display panel 216. The television receiver 200 further includes an audio processing circuit 217, an audio amplification circuit 218, and a speaker 219. The television receiver 200 further includes an internal bus 230, a central processing unit (CPU) 231, a flash ROM 232, a DRAM 233, a receiving unit 234, a network I/F 235, and a network terminal 236.

The CPU 231 controls an operation of each unit of the television receiver 200. The flash ROM 232 stores control software and data, as well as an application properly downloaded from the application server 12. The DRAM 233 constitutes, for example, a work area for the CPU 231. The CPU 231 develops the software and data read from the flash ROM 232 onto the DRAM 233, starts up the software, and controls each unit of the television receiver 200. The CPU 231, the flash ROM 232 and the DRAM 233 are connected to the internal bus 230.

The receiving unit 234 receives, for example, an infrared remote control signal (remote control code) transmitted from the remote controller 800 and supplies the signal to the CPU 231. The user can manipulate the television receiver 200 and another CEC compliant device connected to the television receiver 200 via the HDMI cable by manipulating the remote controller 800.

The network I/F 235 connects to the network 11 via a network cable connected to a network terminal 236, and executes data transmission and reception to and from various devices (e.g., the application server 12) connected to the network 11. In the present embodiment, the television receiver 200 requests the application server 12 to provide an application for controlling the AV amplifier 300 and properly receives the application from the application server 12, such that the television receiver 200 can start up and execute the application for controlling the AV amplifier 300.

The antenna terminal 210 is a terminal that inputs a television broadcast signal received by a receiving antenna (not shown). The digital tuner 211 processes the television broadcast signal input to the antenna terminal 210, and outputs a given transport stream corresponding to a user-selected channel. The demultiplexer 212 extracts a partial transport stream (TS) (a TS packet of video data and a TS packet of audio data) corresponding to the user-selected channel from the transport stream obtained by the digital tuner 212.

The demultiplexer 212 extracts program specific information/service information (PSI/SI) from the transport stream obtained by the digital tuner 211 and outputs the PSI/SI to the CPU 231. A plurality of channels are multiplexed in the transport stream obtained by the digital tuner 211. The process in which the demultiplexer 212 extracts the partial TS of any channel from the transport stream can be performed by obtaining information of a packet ID (P ID) of any channel from the PSI/SI (PAT/PMT).

The MPEG decoder 213 performs a decoding process on a video packetized elementary stream (PES) packet consisting of the TS packet of the video data obtained by the demultiplexer 212 to obtain video data. Also, the MPEG decoder 213 performs a decoding process on an audio PES packet consisting of the TS packet of the audio data obtained by the demultiplexer 212 to obtain audio data.

The video and graphic processing circuit 214 performs a scaling process, a graphics data superimposing process, and the like on the video data acquired by the MPEG decoder 213, as necessary. Also, the video and graphic processing circuit 214 generates video data through a process based on an application stored in the flash ROM 232 in advance or the application properly provided from the application server 12, and outputs the video data to the panel driving circuit 215. The panel driving circuit 215 drives the display panel 216 based on the video data output from the video and graphic processing circuit 214. The display panel 216 includes, for example, a liquid crystal display (LCD), an organic electro-luminescence (EL), or a plasma display panel (PDP).

The audio processing circuit 217 performs a necessary process, such as D/A conversion, on the audio data obtained by the MPEG decoder 213. The audio amplification circuit 218 amplifies an analog audio signal output from the audio processing circuit 217 and supplies the resultant audio signal to the speaker 219. The audio processing circuit 217 converts the audio data obtained by the MPEG decoder 213 into a digital optical signal and outputs the digital optical signal to the optical output terminal 203.

The HDMI switcher 204 selectively connects the HDMI terminals 201 and 202 to the HDMI receiving unit 205. The HDMI receiving unit 205 is selectively connected to any of the HDMI terminals 201 and 202 via the HDMI switcher 204. This HDMI receiving unit 205 receives video and audio data transmitted from an external device (a source device or a repeater device) connected to the HDMI terminal 201 or 202 through communication conforming to HDMI. This HDMI receiving unit 205 will be described in detail later.

An operation of the television receiver 200 shown in FIG. 3 will be briefly described. The television broadcast signal input to the antenna terminal 210 is supplied to the digital tuner 211. This digital tuner 211 processes the television broadcast signal to obtain a transport stream corresponding to the user-selected channel. This transport stream is supplied to the demultiplexer 212. The demultiplexer 212 extracts a partial TS (a TS packet of video data and a TS packet of audio data) corresponding to the user-selected channel from the transport stream. This partial TS is supplied to the MPEG decoder 213.

The MPEG decoder 213 performs a decoding process on a video PES packet consisting of the TS packet of the video data to obtain video data. The video and graphic processing circuit 214 performs a scaling process, a graphics data superimposing process and the like on the video data, as necessary, and supplies the resultant video data to the panel driving circuit 215. Accordingly, a video corresponding to the user-selected channel is displayed on the display panel 216.

The MPEG decoder 213 performs a decoding process on an audio PES packet consisting of the TS packet of the audio data to obtain audio data. The audio processing circuit 217 performs a necessary process such as D/A conversion on the audio data, and the audio amplification circuit 218 amplifies the audio signal and supplies the audio signal to the speaker 219. Accordingly, an audio corresponding to the user-selected channel is output from the speaker 219.

The audio data obtained by the MPEG decoder 213 is converted into, for example, a digital optical signal conforming to the S/PDIF standard by the audio processing circuit 217, and output to the optical output terminal 203. Accordingly, the television receiver 200 can transmit the audio data to the external device via the optical cable. In the AV system 100 shown in FIG. 1, as described above, the audio data from the television receiver 200 is supplied to the AV amplifier 300 via the optical cable 702.

When the AV amplifier 300 is in a system audio mode of ON, an audio by the audio data from the television receiver 200 is output from the speaker set 350 connected to the AV amplifier 300. In this case, the audio amplification circuit 218 enters a muted state under control of the CPU 231, and the audio is not output from the speaker 219 of the television receiver 200.

In the HDMI receiving unit 205, video and audio data input to the HDMI terminal 201 or 202 via the HDMI cable is obtained. The video data is supplied to the video and graphic processing circuit 214. The audio data is supplied to the audio processing circuit 217. A subsequent operation is the same as that upon reception of the above-described television broadcast signal, the video is displayed on the display panel 216, and the audio is output from the speaker 219.

In the AV system 100 shown in FIG. 1, for example, when video and audio by video data and audio data from the video recorder 400, the video player 500 or the video recorder 600 is presented, the state becomes a state in which video and audio by the video data and the audio data acquired by the HDMI receiving unit 205, as described above, is presented.

Even in this case, when the AV amplifier 300 is in a system audio mode of On, the audio by the audio data is output from the speaker set 350 connected to the AV amplifier 300, and the audio amplification circuit 218 of the television receiver 200 enters a muted state, such that the audio is not output from the speaker 219.

Figure 4:
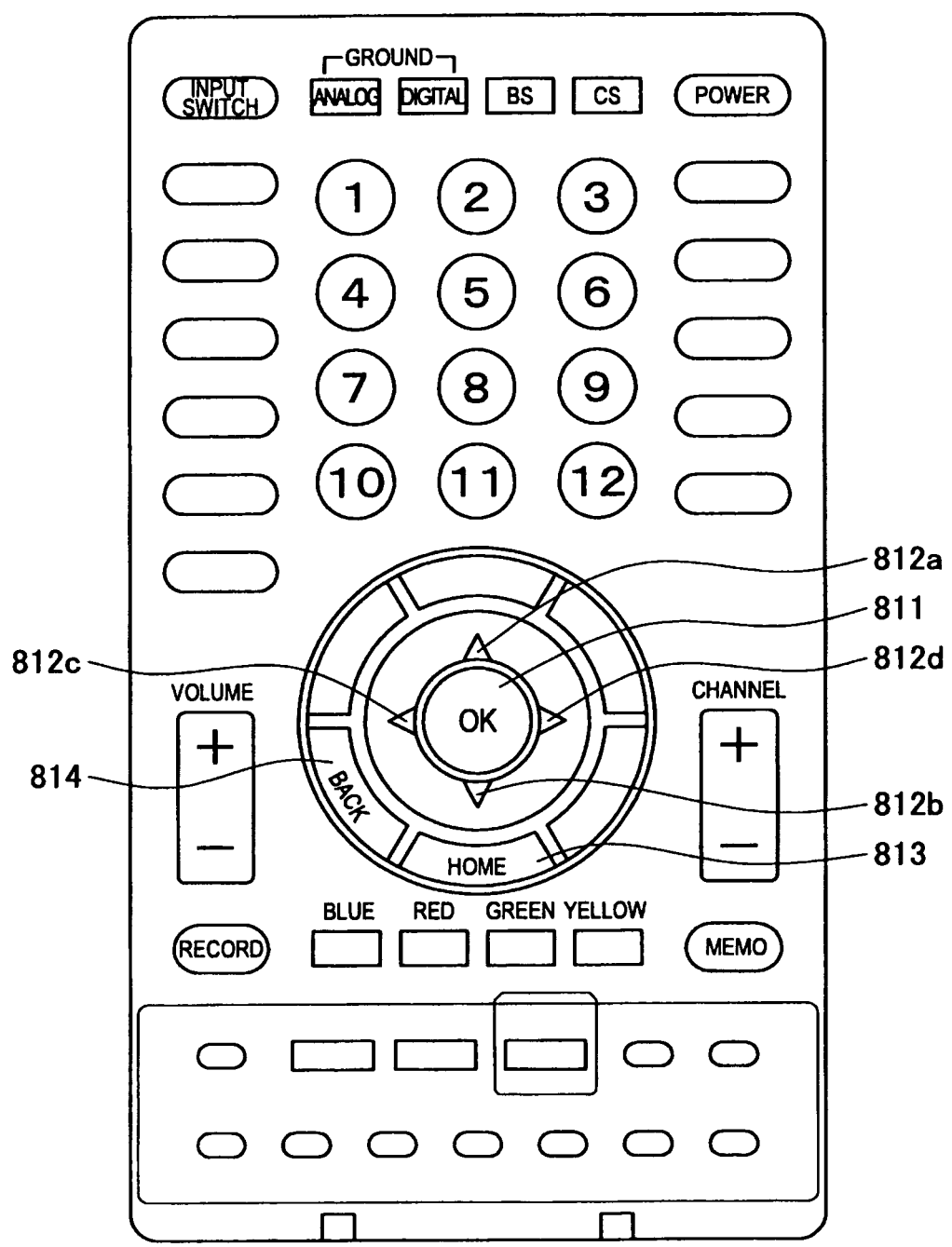
FIG. 4 is a plan view showing a configuration example of a remote controller for the television receiver according to an embodiment of the present invention.

FIG. 4 illustrates an example of a shape of the remote controller 800, viewed from a front view. As shown in FIG. 4, the remote controller 800 includes a remote control signal transmitting unit 801 for transmitting, for example, an infrared signal, in which various manipulation keys 802 are disposed. The manipulation keys 802 include numerical keys for channel indication, a volume up/down key, each mode setting key, and the like. Further, the remote controller 800 includes an OK button 811 for selecting any item from various menu screens displayed on the display panel 216, an up button 812a for moving a cursor displayed on the display panel 216 upward, a down button 812b for moving the cursor displayed on the display panel 216 downward, a left button 812c for moving the cursor displayed on the display panel 216 to the left, a right button 812d for moving the cursor displayed on the display panel 216 to the right, a home button 813 for summoning a screen for executing the application on the television receiver 200 to be displayed on the display panel 216, and a back button 814 for returning to a previous screen. The remote controller 800 may be configured to transmit a signal other than the infrared signal or to bidirectionally exchange the signal with the television receiver 200. Further, the shape of the remote controller 800 or a button arrangement is not limited to such an example in the present invention.

3. Configuration Example of AV Amplifier [FIG. 5]

Figure 5:
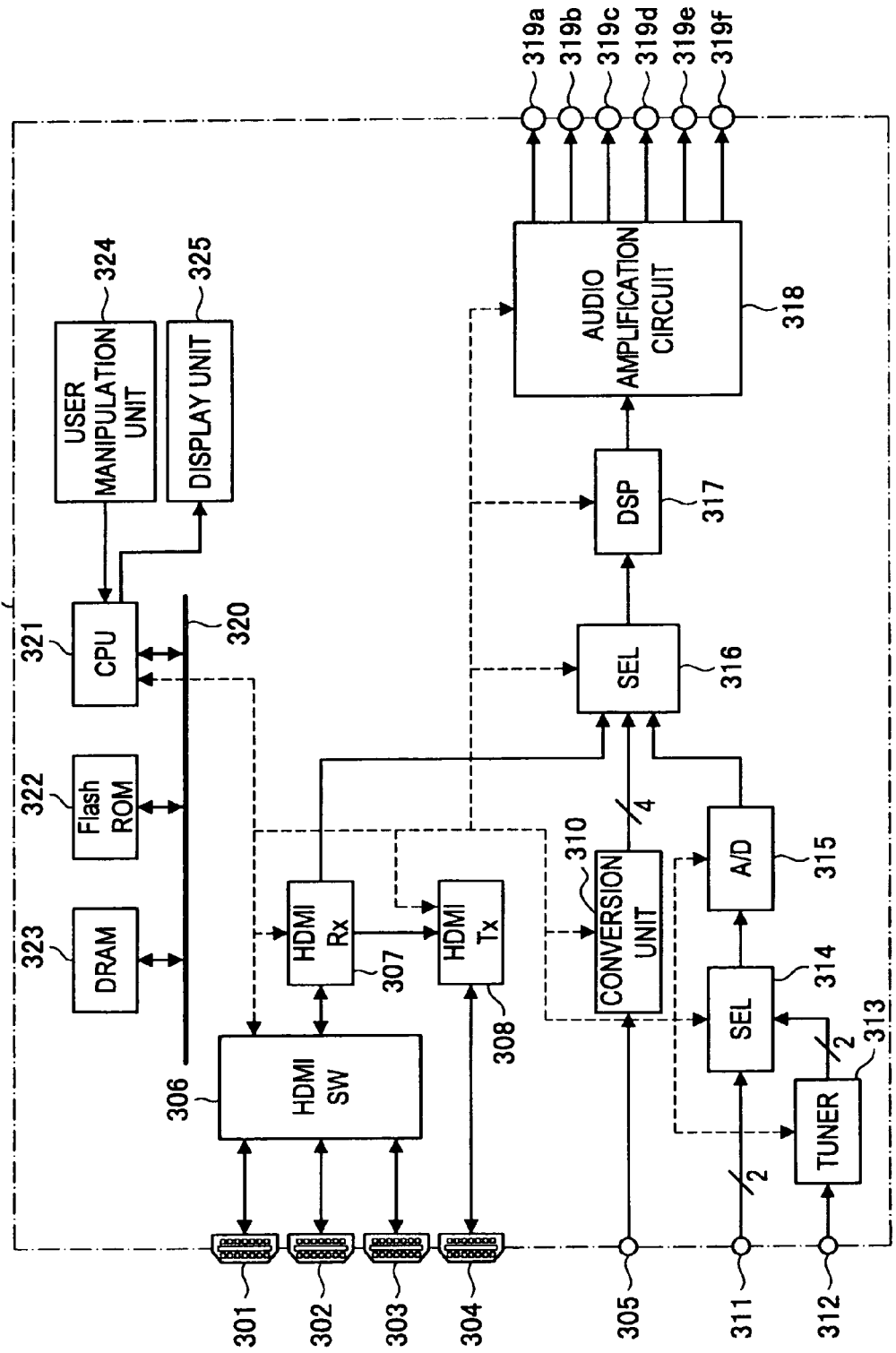
FIG. 5 is a block diagram showing a configuration example of an AV amplifier (repeater device) constituting the AV system according to an embodiment of the present invention.

FIG. 5 shows a configuration example of the AV amplifier 300. The AV amplifier 300 includes HDMI terminals 301 to 304, an optical input terminal 305, an HDMI switcher 306, an HDMI receiving unit 307, an HDMI transmitting unit 308, and a conversion unit 310. The AV amplifier 300 further includes an analog audio input terminal 311, an antenna terminal 312, an FM tuner 313, a selector 314, an A/D converter 315, a selector 316, and a digital signal processor (DSP) 317. Further, the AV amplifier 300 includes an audio amplification circuit 318, audio output terminals 319a to 319f, an internal bus 320, a CPU 321, a flash ROM 322, and a RAM 323.

The CPU 321 controls operation of each unit of the AV amplifier 300. The flash ROM 322 stores control software and data. The RAM 323 constitutes, for example, a work area of the CPU 321. The CPU 321 develops the software or data read from the flash ROM 322 onto the RAM 323 to start up the software and control each unit of the AV amplifier 300. The CPU 321, the flash ROM 322 and the RAM 323 are connected to the internal bus 320. The CPU 321, the flash ROM 322 and the RAM 323 may be a microcomputer of one chip (one chip microcomputer).

A user manipulation unit 324 and a display unit 325 are connected to the CPU 321. The user manipulation unit 324 and the display unit 325 constitute a user interface. Using the user manipulation unit 324, the user can perform selection of an output audio of the AV amplifier 300, tuning by the FM tuner 313, an operation setting, and the like. The user can set the system audio mode to ON/OFF using the user manipulation unit 324.

This user manipulation unit 324 includes keys, buttons, a dial, a remote control signal transmitting and receiving unit, and the like disposed on a chassis, which is not shown, of the AV amplifier 300. The display unit 325 displays an operation status of the AV amplifier 300, a user manipulation state, and the like, and includes a fluorescent display tube, an LCD, or the like.

The optical input terminal 305 is a terminal that inputs a digital optical signal via the optical cable. The conversion unit 310 generates a clock LRCK having the same frequency (e.g., 44.1 kHz) as a sampling frequency of an audio signal, a master clock MCK that is, for example, 512 or 256 times the sampling frequency, left and right 24-bit audio data LDATA and RDATA occurring every period of the clock LRCK, and a bit clock BCK synchronized with each bit of the data from the digital optical signal input to the optical input terminal 305, and supplies them to the selector 316.

The analog audio input terminal 311 is a terminal that inputs left and right analog audio signals obtained in the external device. The antenna terminal 312 is a terminal that inputs an FM broadcast signal FM received by a receiving antenna (not shown). The FM tuner 313 processes the FM broadcast signal (radio broadcast signal) input to the antenna terminal 312 to output left and right analog audio signals corresponding to the user-selected channel. The selector 314 selects the analog audio signal input to the analog audio input terminal 311 or the analog audio signal output from the tuner 313. The A/D converter 315 converts the analog audio signal selected by the selector 314 into digital audio data and supplies the digital audio data to the selector 316.

The HDMI switcher 306 selectively connects the HDMI terminals 301 to 303 to the HDMI receiving unit 307. The HDMI receiving unit 307 is selectively connected to any of the HDMI terminals 301 to 303 via the HDMI switcher 306. This HDMI receiving unit 307 receives video and audio data transmitted in one direction from external devices (source devices) connected to the HDMI terminals 301 to 303 through communication conforming to HDMI.

The HDMI receiving unit 307 supplies the audio data to the selector 316, and supplies the video and audio data to the HDMI transmitting unit 308. The HDMI transmitting unit 308 transmits, from the HDMI terminal 304, the baseband video and audio data supplied from the HDMI receiving unit 307 through the communication conforming to HDMI. Thus, the AV amplifier 300 has a repeater function. The HDMI receiving unit 307 and the HDMI transmitting unit 308 will be described in detail later.

The selector 316 selects the audio data supplied from the HDMI receiving unit 307, the audio data supplied from the conversion unit 310 or the audio data supplied from the A/D converter 315, and supplies the audio data to the DSP 317.

The DSP 317 performs a process of processing the audio data obtained by the selector 316 to generate audio data of each channel for realizing surround audio, a process of giving a given sound field property and an acoustic property, a process of converting a digital signal into an analog signal, and the like. For example, the DSP 317 can perform sound field processing of 5.1 channel surround audio, and enables another mode such as 2-channel audio. The audio amplification circuit 318 amplifies a front left audio signal SFL, a front right audio signal SFR, a front center audio signal SFC, a rear left audio signal SRL, a rear right audio signal SRR and a subwoofer audio signal SSW output from the DSP 317, and outputs the signals to the audio output terminals 319a to 319f.

Although not shown, speaker constituting the speaker set 350 are connected to the audio output terminals 319a to 319f. That is, a front left speaker, a front right speaker, a front center speaker, a rear left speaker, a rear right speaker and a subwoofer speaker are connected. Here, through, for example, a virtual sound localization process in the DSP 317, surround audio may be reproduced by a smaller number of speakers.

An operation of the AV amplifier 300 shown in FIG. 5 will be briefly described. In the HDMI receiving unit 307, the baseband video and audio data input to the HDMI terminals 301 to 303 via the HDMI cable is obtained. This video and audio data is supplied to the HDMI transmitting unit 308 and transmitted to the HDMI cable connected to the HDMI terminal 304.

Further, the audio data obtained in the HDMI receiving unit 307 is supplied to the selector 316. In the selector 316, the audio data supplied from the HDMI receiving unit 307, the audio data supplied from the conversion unit 310, or the audio data supplied from the A/D converter 315 is selected and supplied to the DSP 317.

In the DSP 317, necessary processes such as a process of generating audio data of each channel for realizing the 5.1 channel surround, a process of giving a given sound field property, a process of converting the digital signal into an analog signal, and the like are performed on the audio data. Audio signals of respective channels output from the DSP 317 are output to the audio output terminals 319a to 319f via the audio amplification circuit 318.

For example, in the AV system 100 shown in FIG. 1, when the program tuned by the digital tuner 211 of the television receiver 200 is viewed and the AV amplifier 300 is in a system audio mode of ON, the following operation is performed. That is, the selector 316 selects the audio data from the conversion unit 310. Accordingly, the audio signals of the respective channels according to the audio data of the program tuned by the digital tuner 211 of the television receiver 200 are output from the audio output terminals 319a to 319f. Thus, the audio of the program tuned by the digital tuner 211 of the television receiver 200 is output from the speaker set 350 connected to the AV amplifier 300.

When the program tuned by the digital tuner 211 of the television receiver 200 is viewed and the AV amplifier 300 is in the system audio mode of OFF, the audio amplification circuit 318 enters a muted state. Accordingly, the audio signal is not supplied from the audio amplification circuit 318 to the output terminals 319a to 319f.

For example, in the AV system 100 shown in FIG. 1, when a video and audio by the video data and the audio data from the video recorder 400 are presented and the AV amplifier 300 is in the system audio mode of ON, the following operation is performed. That is, the HDMI terminal 301 is connected to the HDMI receiving unit 307 by the HDMI switcher 306. Further, in the selector 316, the audio data from the HDMI receiving unit 307 is selected. Accordingly, the audio signals of the respective channels according to the audio data from the video recorder 400 are output from the audio output terminals 319a to 319f. Thus, the audio by the audio data from the video recorder 400 is output from the speaker set 350 connected to the AV amplifier 300.

When the video and audio by video data and the audio data from the video recorder 400 are presented and the AV amplifier 300 is in the system audio mode of OFF, the audio amplification circuit 318 enters a muted state, and the audio signal is not supplied from the audio amplification circuit 318 to the audio output terminals 319a to 319f.

For example, in the AV system 100 shown in FIG. 1, when the video and audio by the video data and the audio data from the video player 500 are presented and the AV amplifier 300 is in the system audio mode of ON, the following operation is performed. That is, the HDMI terminal 302 is connected to the HDMI receiving unit 307 by the HDMI switcher 306. Further, in the selector 316, the audio data from the HDMI receiving unit 307 is selected. Accordingly, the audio signals of the respective channels according to the audio data from the video player 500 are output from the audio output terminals 319a to 319f. Thus, the audio by the audio data from the video player 500 is output from the speaker set 350 connected to the AV amplifier 300.

When the video and audio by the video data and the audio data from the video player 500 are presented and the AV amplifier 300 is in the system audio mode of OFF, the audio amplification circuit 318 enters a muted state, and the audio signal is not supplied from the audio amplification circuit 318 to the audio output terminals 319a to 319f.

4. Configuration Example of Application Server [FIG. 6]

Figure 6:
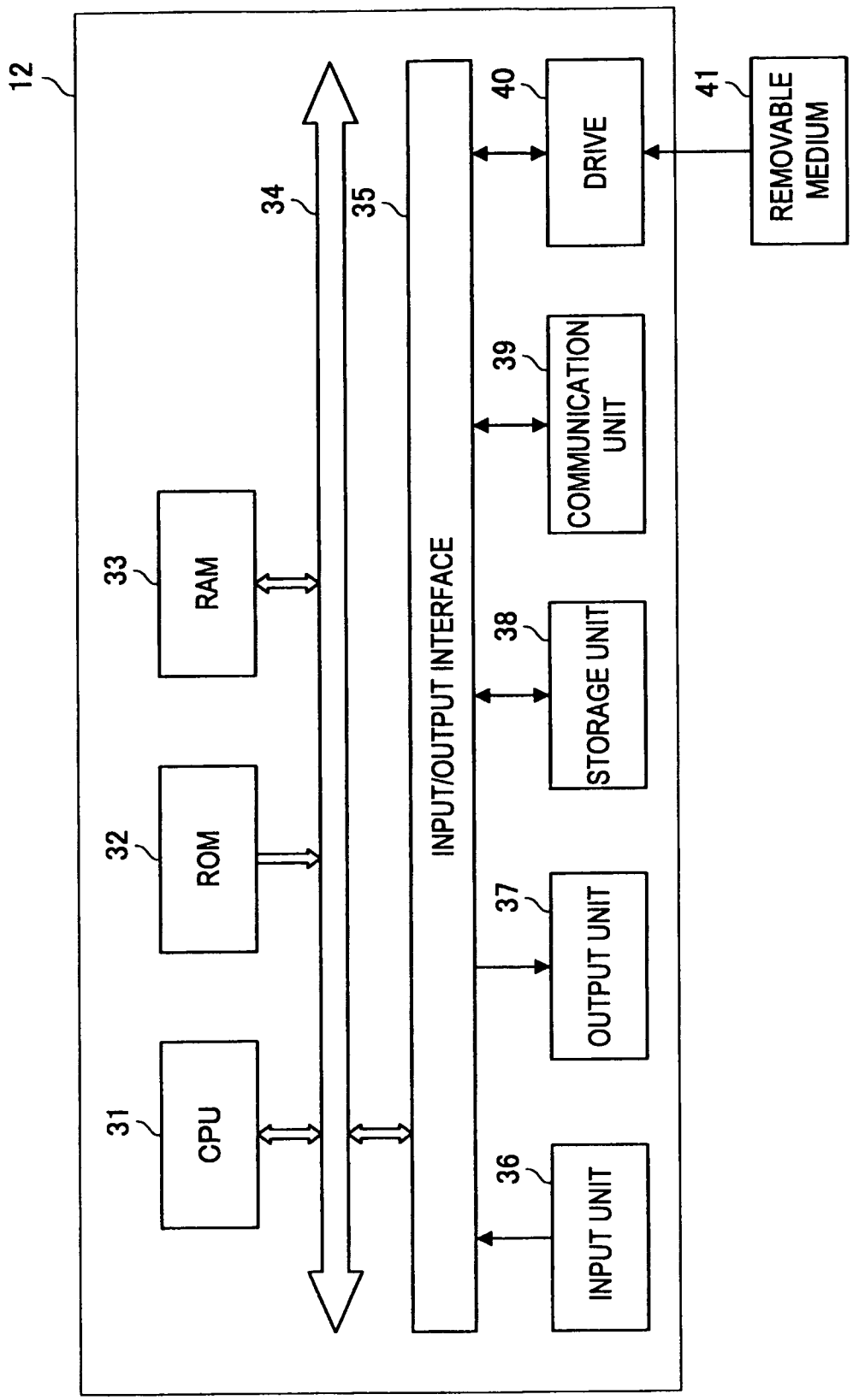
FIG. 6 is a block diagram showing a configuration example of an application server in an embodiment of the present invention.

FIG. 6 shows a configuration example of the application server 12. The application server 12 includes a CPU 31, a ROM 32, a RAM 33, a bus 34, an input/output interface 35, an input unit 36, an output unit 37, a storage unit 38, a communication unit 39, and a drive 40.

The CPU 31, the ROM 32, and the RAM 33 are connected to one another via the bus 34. The input/output interface 35 is also connected to the bus 34. The input unit 36 such as a keyboard, a mouse or a microphone, the output unit 37 such as a display or a speaker, the storage unit 38 such as a hard disk or a nonvolatile memory, the communication unit 39 such as a network interface or a removable medium 41 such as a magnetic disk, an optical disk or a magneto-optical disk, and the drive 40 for driving a semiconductor memory are connected to the input/output interface 35.

In the application server 12 configured as described above, the CPU 31 loads, for example, a program stored in the storage unit 38 onto the RAM 33 via the input/output interface 35 and the bus 34 and executes the program, such that the application server 12 can properly provide the application according to the request from the television receiver 200.

5. HDMI Standard Transmission Configuration and Process Example [FIGS. 7 to 9]

Figure 7:
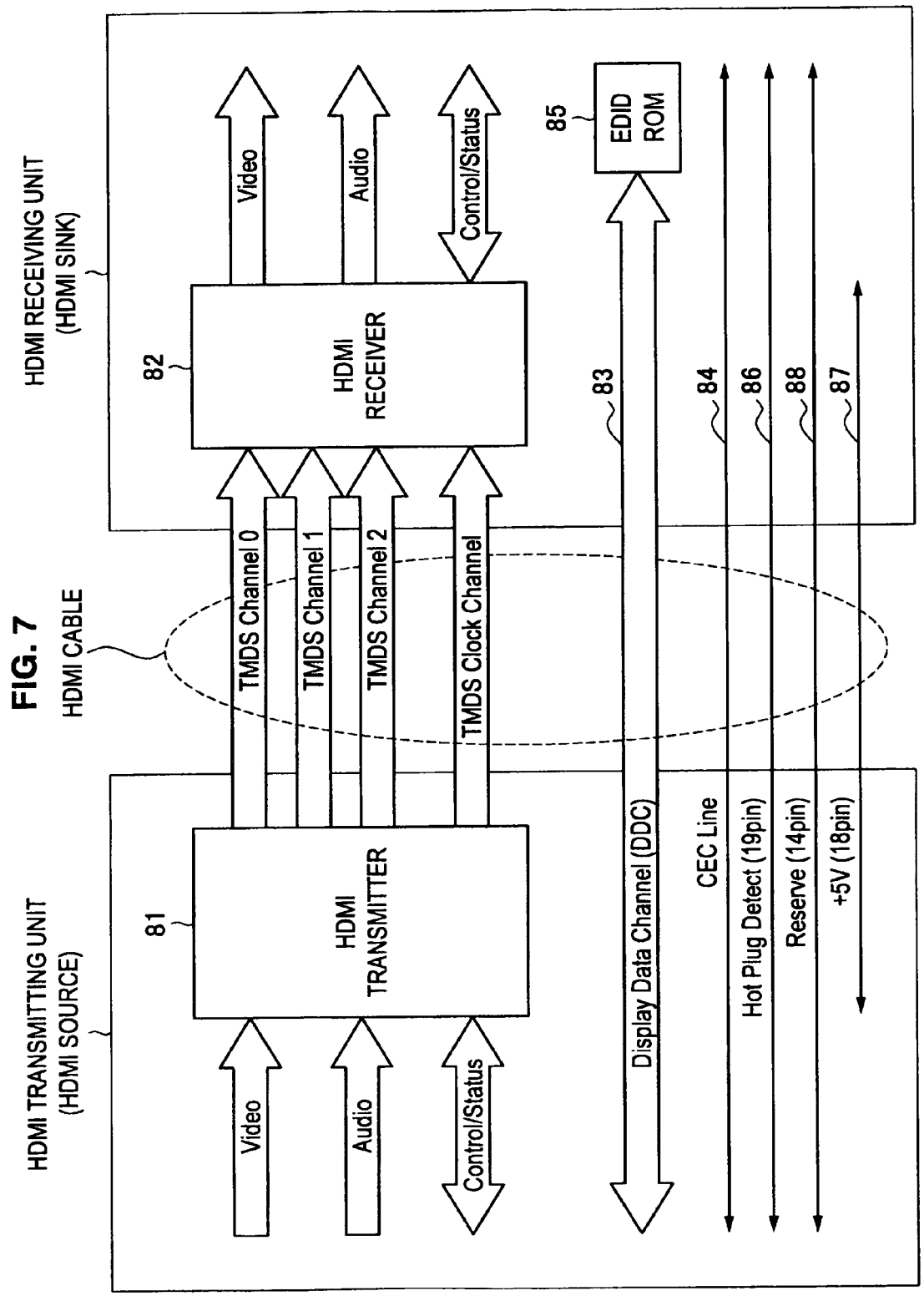
FIG. 7 is a block diagram showing a configuration example of an HDMI transmitting unit (HDMI source) and an HDMI receiving unit (HDMI sink)

FIG. 7 shows a configuration example of the HDMI transmitting unit (HDMI transmitting unit 308) and the HDMI receiving unit (HDMI receiving unit 205 and HDMI receiving unit 307).

The HDMI transmitting unit (HDMI source) performs transmission in one unit in a valid video period (hereinafter, referred to properly as an active video period) that is a period obtained by excluding a horizontal blacking period and a vertical blacking period from a period from one vertical synchronization signal to a next vertical synchronization signal. That is, in the active video period, the HDMI transmitting unit transmits, in one direction, a differential signal corresponding to non-compressed video pixel data corresponding to one screen to the HDMI receiving unit (HDMI sink) via a plurality of channels. In the horizontal blacking period or the vertical blacking period, the HDMI transmitting unit transmits, in one direction, a differential signal corresponding to at least the audio data associated with the video, control data, other auxiliary data, and the like to the HDMI receiving unit via a plurality of channels.

The HDMI transmitting unit includes a transmitter 81. The transmitter 81 converts, for example, non-compressed video pixel data into a corresponding differential signal, and serially transmits, in one direction, the differential signal to the HDMI receiving unit connected via the HDMI cable via a plurality of channels, i.e., three TMDS channels #0, #1 and #2.

The transmitter 81 converts audio data associated with non-compressed video, necessary control data, other auxiliary data and the like into a corresponding differential signal. The transmitter 81 serially transmits, in one direction, the differential signal to the HDMI receiving unit connected via the HDMI cable, via three TMDS channels #0, #1 and #2.

The transmitter 81 transmits the pixel clock synchronized to the pixel data transmitted via three TMDS channels #0, #1 and #2 to the HDMI receiving unit connected via the HDMI cable via the TMDS clock channel. Here, via one TMDS channel #i (i=0, 1, 2), 10-bit pixel data is transmitted during one clock of the pixel clock.

The HDMI receiving unit, in an active video period, receives a differential signal corresponding to the pixel data that is transmitted in one direction from the HDMI transmitting unit via a plurality of channels. Further, the HDMI receiving unit, in the horizontal blacking period or the vertical blacking period, receives a differential signal corresponding to audio data or control data that is transmitted in one direction from the HDMI transmitting unit via a plurality of channels.

That is, the HDMI receiving unit includes a receiver 82. The receiver 82 receives a differential signal corresponding to the pixel data and a differential signal corresponding to the audio data or the control data transmitted in one direction from the HDMI transmitting unit via the TMDS channels #0, #1 and #2. In this case, the receiver 82 receives in synchronization with the pixel clock transmitted from the HDMI transmitting unit via the TMDS clock channel.

The transmission channels of the HDMI system include three TMDS channels #0 to #2 as transmission channels for serially transmitting pixel data and audio data, and a TMDS clock channel as a transmission channel that transmits a pixel clock. Further, there is a transmission channel called a display data channel (DDC) 83 or a CEC line 84.

The DDC 83 is used for the HDMI transmitting unit to read enhanced extended display identification data (E-ED ID) from the HDMI receiving unit connected via the HDMI cable. The DDC 83 includes two signal lines, not shown, included in the HDMI cable.

That is, the HDMI receiving unit includes an ED ID ROM 85, in addition to the HDMI receiver 82. The ED ID ROM 85 stores an E-ED ID that is performance information about its performance (configuration/capability). The HDMI transmitting unit reads, from the HDMI receiving unit connected via the HDMI cable, the E-ED ID of the HDMI receiving unit via the DDC 83. Based on the read E-ED ID, the HDMI transmitting unit, for example, recognizes a format (profile) of a video to which an electronic device having the HDMI receiving unit corresponds, such as RGB, YCbCr4:4:4, YCbCr4:2:2, and the like.

The CEC line 84 includes one signal line, which is not shown, included in the HDMI cable, and is used to perform bidirectional communication of control data between the HDMI transmitting unit and the HDMI receiving unit. The bidirectional communication is performed in time division.

A line 86 connected to a pin called a hot plug detect (HPD) is included in the HDMI cable. A source device can detect a connection of a sink device using the line 86. Further, the HDMI cable includes a line 87 used to supply power from the source device to the sink device. The HDMI cable also includes a reserved line 88.

Figure 8:
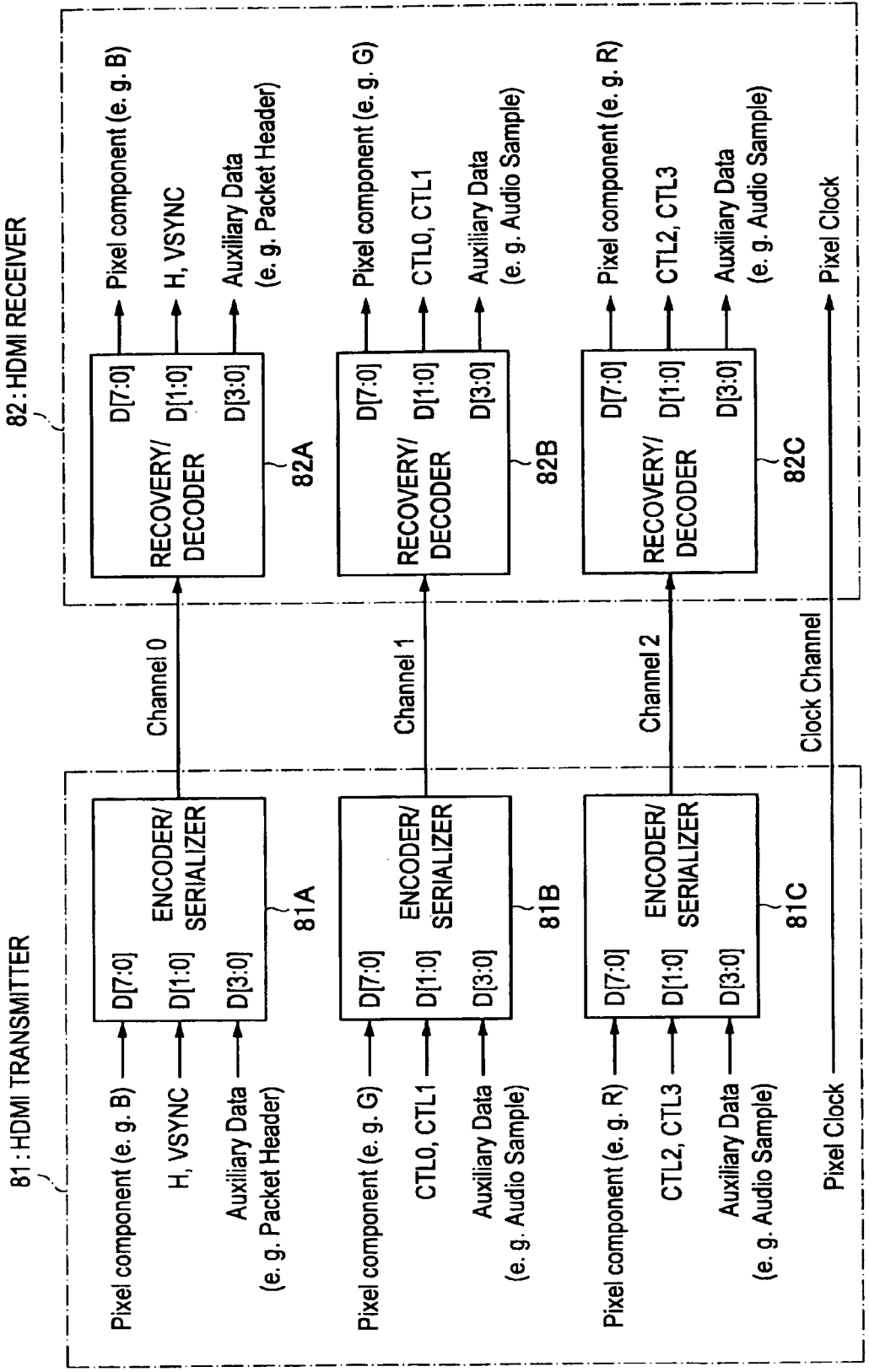
FIG. 8 is a block diagram showing a configuration example of an HDMI transmitter and an HDMI receiver.

FIG. 8 shows a configuration example of the HDMI transmitter 81 and the HDMI receiver 82 of FIG. 7.

The HDMI transmitter 81 includes three encoder/serializers 81A, 81B and 81C corresponding to three TMDS channels #0, #1 and #2. Each of the encoder/serializers 81A, 81B and 81C encodes supplied video data, auxiliary data, and control data, converts parallel data into serial data, and transmits the serial data by means of a differential signal.

Here, when the video data has, for example, 3 components: R (red), G (green) and B (blue), the following operation is performed. That is, the B component is supplied to the encoder/serializer 81A, the G component is supplied to the encoder/serializer 81B, and the R component is supplied to the encoder/serializer 81C.

The auxiliary data includes, for example, audio data and a control packet. For example, the control packet is supplied to the encoder/serializer 81A and the audio data is supplied to the encoder/serializers 81B and 81C.

Further, the control data includes a 1-bit vertical synchronization signal (VSYNC), a 1-bit horizontal synchronization signal (HSYNC), and control bits CTL0, CTL1, CTL2, and CTL3, each being 1 bit. The vertical synchronization signal and the horizontal synchronization signal are supplied to the encoder/serializer 81A. The control bits CTL0 and CTL1 are supplied to encoder/serializer 81B, and the control bits CTL2 and CTL3 are supplied to encoder/serializer 81C.

The encoder/serializer 81A transmits, in time division, the B component of the video data, the vertical synchronization signal and the horizontal synchronization signal, and the auxiliary data, which are supplied. That is, the encoder/serializer 81A converts the supplied B component of the video data into parallel data in an 8-bit unit that is a fixed bit number. Further, the encoder/serializer 81A encodes the parallel data, converts it into serial data, and transmits the serial data via the TMDS channel #0.

Further, the encoder/serializer 81A encodes 2-bit parallel data of the supplied vertical synchronization signal and horizontal synchronization signal, converts the parallel data into serial data, and transmits the serial data via the TMDS channel #0. The encoder/serializer 81A also converts the supplied auxiliary data into parallel data in a 4-bit unit. The encoder/serializer 81A encodes the parallel data, converts the parallel data into serial data, and transmits the serial data via the TMDS channel #0.

The encoder/serializer 81B transmits, in time division, the G component of the video data, the control bits CTL0 and CTL1, and the auxiliary data that are supplied. That is, the encoder/serializer 81B converts the supplied G component of the video data into parallel data in an 8-bit unit that is a fixed bit number. Further, the encoder/serializer 81B encodes the parallel data, converts the parallel data into serial data, and transmits the serial data via the TMDS channel #1.

The encoder/serializer 81B encodes 2-bit parallel data of the supplied control bits CTL0 and CTL1, converts the parallel data into serial data, and transmits serial data via the TMDS channel #1. Further, the encoder/serializer 81B converts the supplied auxiliary data into parallel data in a 4-bit unit. The encoder/serializer 81B encodes the parallel data, converts the parallel data into serial data, and transmits the serial data via the TMDS channel #1.

The encoder/serializer 81C transmits, in time division, the R component of the video data, the control bits CTL2 and CTL3, and the auxiliary data that are supplied. That is, the encoder/serializer 81C converts the supplied R component of the video data into parallel data in an 8-bit unit that is a fixed bit number. Further, the encoder/serializer 81C encodes the parallel data, converts the parallel data into serial data, and transmits the serial data via the TMDS channel #2.

The encoder/serializer 81C encodes 2-bit parallel data of the supplied control bits CTL2 and CTL3, converts parallel data into serial data, and transmits the serial data via the TMDS channel #2. Further, the encoder/serializer 81C converts the supplied auxiliary data into parallel data in a 4-bit unit. The encoder/serializer 81C encodes the parallel data and converts the parallel data into serial data, and transmits the serial data via the TMDS channel #2.

The receiver 82 includes three recovery/decoders 82A, 82B and 82C corresponding to the three TMDS channels #0, #1 and #2. The respective recovery/decoders 82A, 82B and 82C receive the video data, the auxiliary data, and the control data transmitted by the differential signal via the TMDS channels #0, #1 and #2. Further, each of the recovery/decoders 82A, 82B and 82C converts the video data, the auxiliary data and the control data from serial data to parallel data, decodes the parallel data, and outputs the resultant data.

That is, the recovery/decoder 82A receives the B component of the video data, the vertical synchronization signal and the horizontal synchronization signal, and the auxiliary data transmitted by the differential signal via the TMDS channel #0. The recovery/decoder 82A converts the B component of the video data, the vertical synchronization signal and the horizontal synchronization signal, and the auxiliary data from the serial data to the parallel data, decodes the parallel data and outputs the resultant data.

The recovery/decoder 82B receives the G component of the video data, the control bits CTL0 and CTL1, and the auxiliary data transmitted by the differential signal via the TMDS channel #1. The recovery/decoder 82B converts the G component of the video data, the control bits CTL0 and CTL1, and the auxiliary data from the serial data to parallel data, decodes the parallel data and outputs the resultant data.

The recovery/decoder 82C receives the R component of the video data, the control bits CTL2 and CTL3, and the auxiliary data transmitted by the differential signal via the TMDS channel #2. The recovery/decoder 82C converts the R component of the video data, the control bits CTL2 and CTL3, and the auxiliary data from the serial data to the parallel data, decodes the parallel data and outputs the resultant data.

Figure 9:
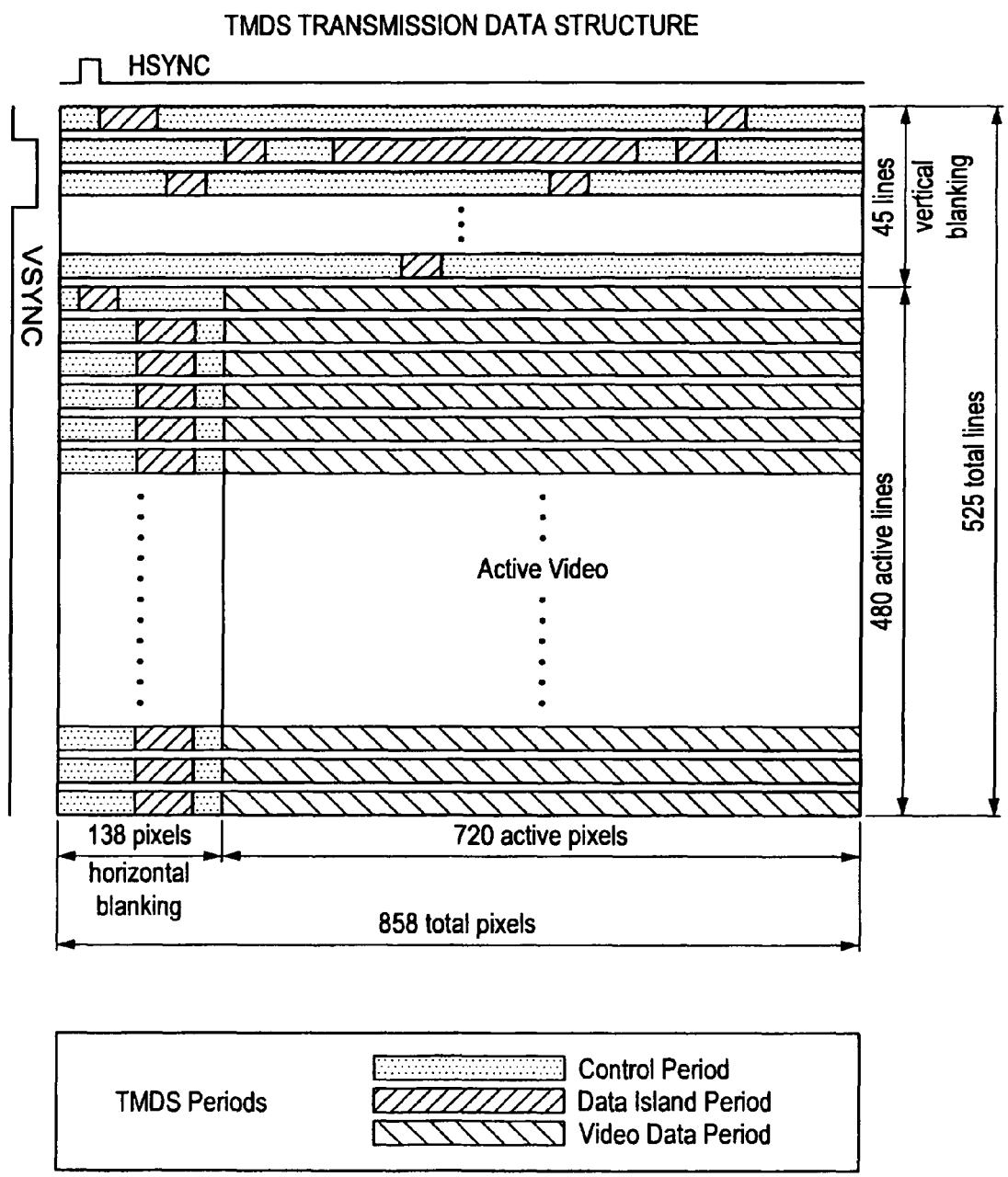
FIG. 9 shows a structure of TMDS transmission data.
Figure 10:
FIG. 10 illustrates an example of a video displayed on a display panel of a television receiver.

FIG. 9 shows an example of a transmission period (section) in which various transmission data is transmitted via three TMDS channels #0, #1 and #2 of HDMI. FIG. 10 shows a period of various transmission data when a progressive video of 720×480 pixels is transmitted in the TMDS channels #0, #1 and #2.

A video field in which the transmission data is transmitted via the three TMDS channels #0, #1 and #2 of HDMI includes the following periods according to the type of the transmission data. That is, the video field includes three periods: a video data period, a data island period, and a control period.

The video field period is a period from an active edge of any vertical synchronization signal to an active edge of a next vertical synchronization signal. This period is divided into a horizontal blanking period, a vertical blanking period, and an active video period. The active video period is a period obtained by excluding the horizontal blanking period and the vertical blanking period from the video field period.

The video data period is assigned to the active video period. In this video data period, active pixel data of 720 pixels×480 lines constituting non-compressed video data corresponding to one screen is transmitted.

The data island period and the control period are assigned to the horizontal blanking period and the vertical blanking period. In the data island period and the control period, the auxiliary data is transmitted.

That is, the data island period is assigned to a portion of the horizontal blanking period and the vertical blanking period. In this data island period, for example, an audio data packet that is data not related to the control among the auxiliary data is transmitted.

The control period is assigned to portions other than the horizontal blanking period and the vertical blanking period. In this control period, for example, the vertical synchronization signal and the horizontal synchronization signal, the control packet and the like that are control-related data among the auxiliary data are transmitted.

Here, in the current HDMI, a frequency of the pixel clock transmitted via the TMDS clock channel is, for example, 165 MHz, and in this case, a transmission rate of the data island period is about 500 Mbps.

6. Operation Example of Television Receiver and AV Amplifier [FIGS. 10 to 35]

Next, an operation of the television receiver 200 will be described. First, contents of a screen displayed on the display panel 216 by the television receiver 200 executing an application properly provided from the application server 12 will be described.

FIG. 10 illustrates an example of a video displayed on the display panel 216 of the television receiver 200. To execute the received application properly provided from the application server 12, on the television receiver 200, from this state, for example, the user presses a given button (e.g., the Home button 813) of the remote controller 800. The user can cause a screen for executing an application (hereinafter, referred to as an "initial screen") to be displayed on the display panel 216 of the television receiver 200 by pressing the given button of the remote controller 800.

Figure 11:
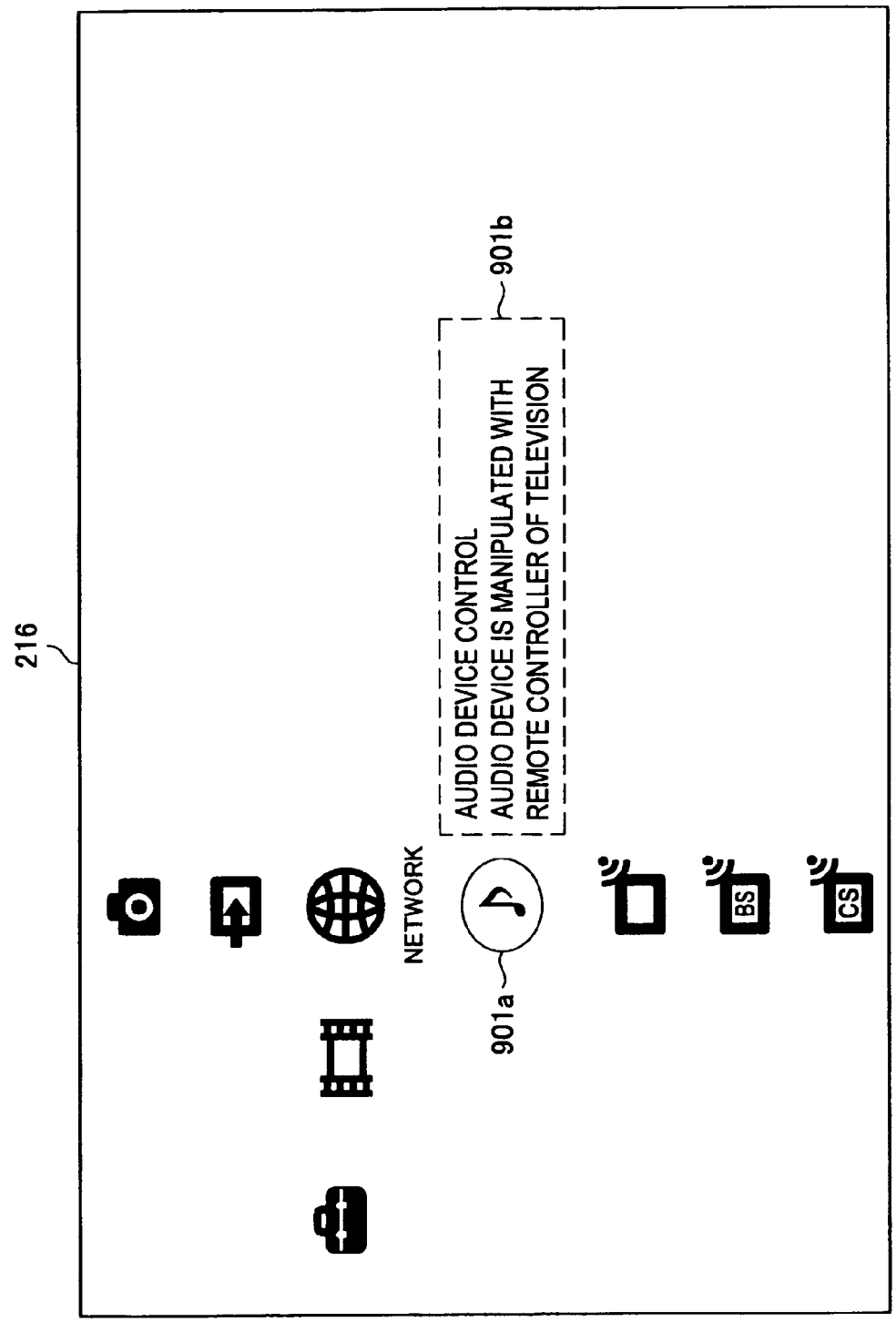
FIG. 11 illustrates an example of an initial screen displayed on the display panel.

FIG. 11 illustrates an example of the initial screen displayed by the display panel 216. An icon 901*a* for starting up an application for manipulating the AV amplifier 300 using the remote controller 800 of the television receiver 200 (hereinafter, also referred to as "audio device control application") and a sentence 901*b* explaining the application are displayed on the initial screen shown in FIG. 11. A dotted line shown in FIG. 11 is for explanation and is not displayed on an actual initial screen.

As a process of displaying the initial screen on the display panel 216, a process disclosed in, for example, International Publication No. 2008/093780, may be used. That is, the television receiver 200 operates to display the icon and the sentence explaining the application on the display panel 216 based on an application list supplied from the application server 12. A control of a display operation of the display panel 216 is performed, for example, by the CPU 231 executing a display control for the video and graphic processing circuit 214. The user of the television receiver 200 selects any icon and presses a given button of the remote controller 800 (e.g., an OK button 811) in order to cause the application to be executed in the television receiver 200.

Figure 12:
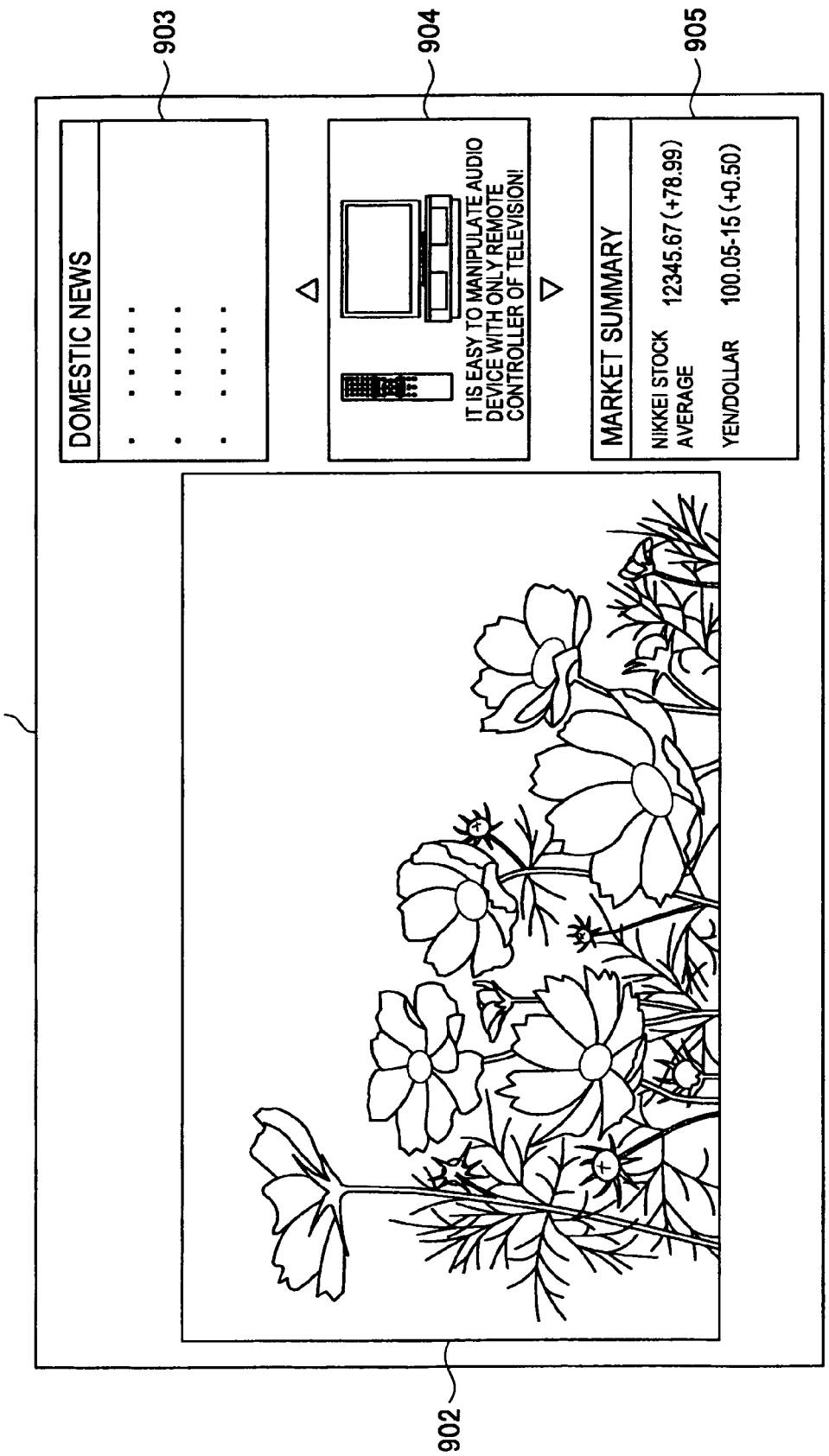
FIG. 12 illustrates an example of a screen displayed by the display panel.

FIG. 12 illustrates an example of a screen displayed when the user presses the OK button 811 of the remote controller 800, for example, on the initial screen in the state shown in FIG. 11. When the user presses the OK button 811 on the initial screen, as shown in FIG. 12, a video of a broadcast received by the television receiver 200 or a video transmitted from, for example, the video recorder 400, is displayed in a video display area 902 on the display panel 216. In addition, services of the application supplied from the application server 12 by pressing the OK button 811 and held in the flash ROM 232 started up by the CPU 231 and are displayed in application display areas 903, 904 and 905 by a graphic process in the video and graphic processing circuit 214 and a panel driving process in the panel driving circuit 215. In the example shown in FIG. 12, service displayed in the application display area 904 among the services displayed in the application display areas 903, 904 and 905 is the service of the audio device control application. In the present invention, in the screen shown in FIG. 12, a transition may occur from the state in which the screen as shown in FIG. 10 is displayed, not via the initial screen shown in FIG. 11, by pressing a given button of the remote controller 800.

As a process of acquiring the application from the application server 12, for example, a process disclosed in the International Publication No. 2008/093780 may be used. The television receiver 200 does not download the entire application from the application server 12 at once, but properly downloads up-to-date files from the application server 12 as necessary.

A video when the user does not cause the audio device control application to transition to an active mode after registering the audio device control application in the television receiver 200 is displayed in the application display area 904 of FIG. 12. Here, the registration of the application refers to setting the television receiver 200 to start up the service even with an application other than a selected application when the user selects any application from the initial screen. It is understood that it is possible to select an application from the initial screen and start up the service of the application without registering the application. The active mode refers to a mode in which only information provided by one application is displayed on the display panel 216. On the other hand, a state in which information provided by a plurality of applications is displayed as in FIG. 12 is called a normal mode.

Figure 13:
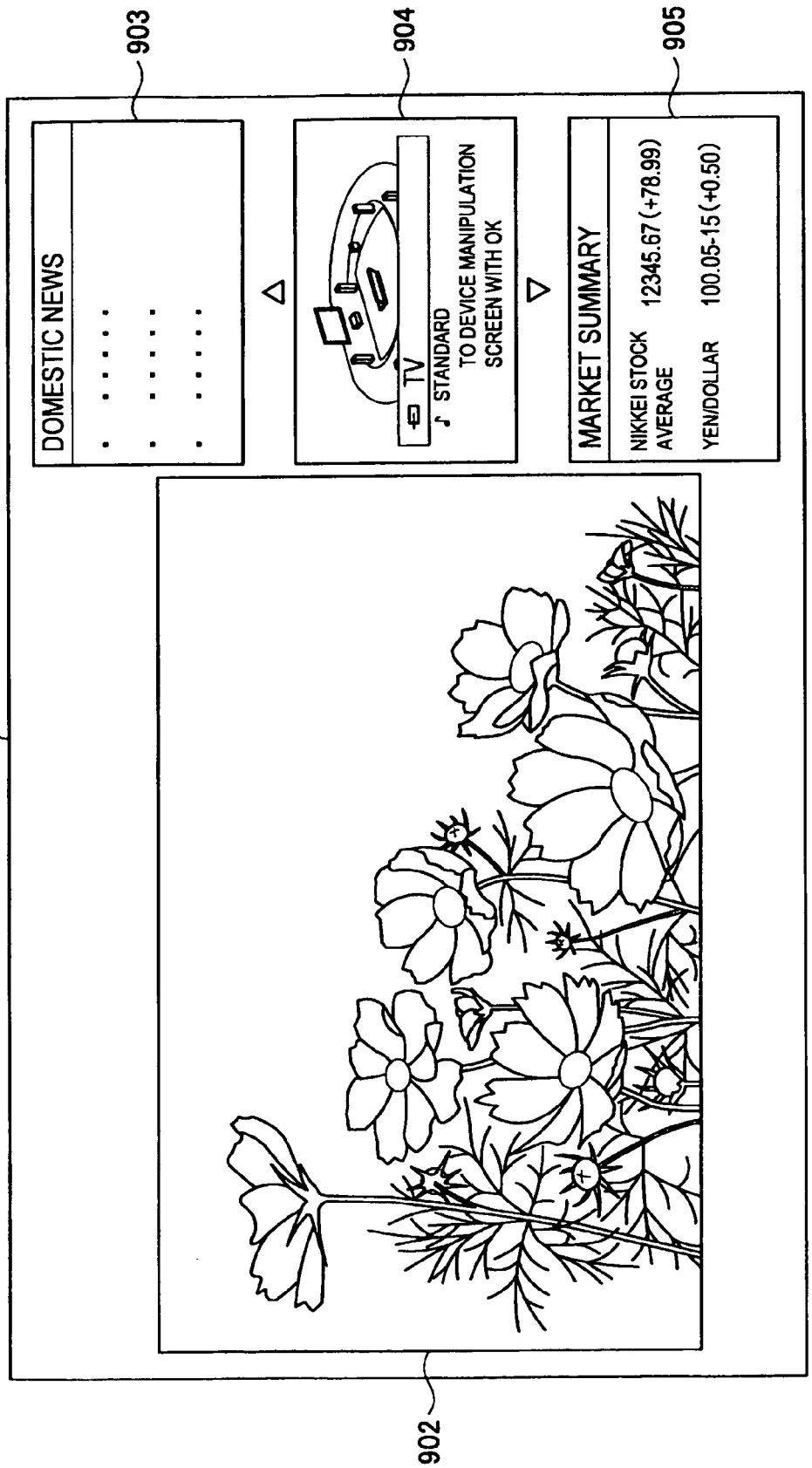
FIG. 13 illustrates an example of the screen displayed by the display panel.

FIG. 13 illustrates an example of a screen displayed when the user presses the OK button 811 of the remote controller 800 on the initial screen in the state shown in FIG. 11. When the CPU 231 detects that the OK button 811 is pressed, the CPU 231 executes the audio device control application and causes the screen as shown in FIG. 13 to be displayed on the display panel 216. In the screen shown in FIG. 13, a video when the user causes the audio device control application to transition to the active mode at least once after registering the audio device control application in the television receiver 200 is displayed on the display panel 216. Thus, the video displayed on the display panel 216 may be changed according to whether the audio device control application transitions to the active mode.

Information indicating that an audio input of the AV amplifier 300 connected to the television receiver 200 is the television receiver 200 (TV) and a sound field is particularly a standard not subjected to audio processing is displayed in the application display area 904 of FIG. 13. This information may be obtained by the television receiver 200 inquiring the AV amplifier 300 about settings of the audio input and the sound field using an HDMI-CEC message according to a command of the CPU 31 of the application server 12, and the AV amplifier 300 replying with settings of the audio input and the sound field to the television receiver 200.

FIG. 14A illustrates an example of a screen displayed on the display panel 216 when the user presses the OK button 811 of the remote controller 800 to cause the audio device control application to transition from the normal mode to the active mode, in a state in which the screen in a state shown in FIG. 13 is displayed on the display panel 216. When the CPU 231 detects that the OK button 811 has been pressed, the CPU 231 performs a process to cause the audio device control application to transition from the normal mode to the active mode and change the screen display on the display panel 216.

In the example shown in FIG. 14A, a screen for setting audio input sources of the AV amplifier 300 is displayed in the application display area 911 of the display panel 216. The user can change the audio input source of the AV amplifier 300 by manipulating the remote controller 800. In a related art, the audio input source of the AV amplifier can be changed using the remote controller of the television receiver, but information of an input selected by the AV amplifier may not be displayed on the television receiver, making it difficult to operate on the screen of the television receiver. Further, since the manipulation is limited, in practice, switching of the input of the AV amplifier using the remote controller of the television receiver is not performed much, and in the manipulation, the user needs to change the setting of the AV amplifier by manipulating the remote controller of the AV amplifier. In the present embodiment, it is possible to control a process unique to the AV amplifier 300 from the television receiver 200 by the user manipulating the remote controller 800 of the television receiver 200 while viewing the screen displayed on the display panel 216 when the television receiver 200 executes the audio device control application properly downloaded from the application server 12, as necessary.

Figure 14B:
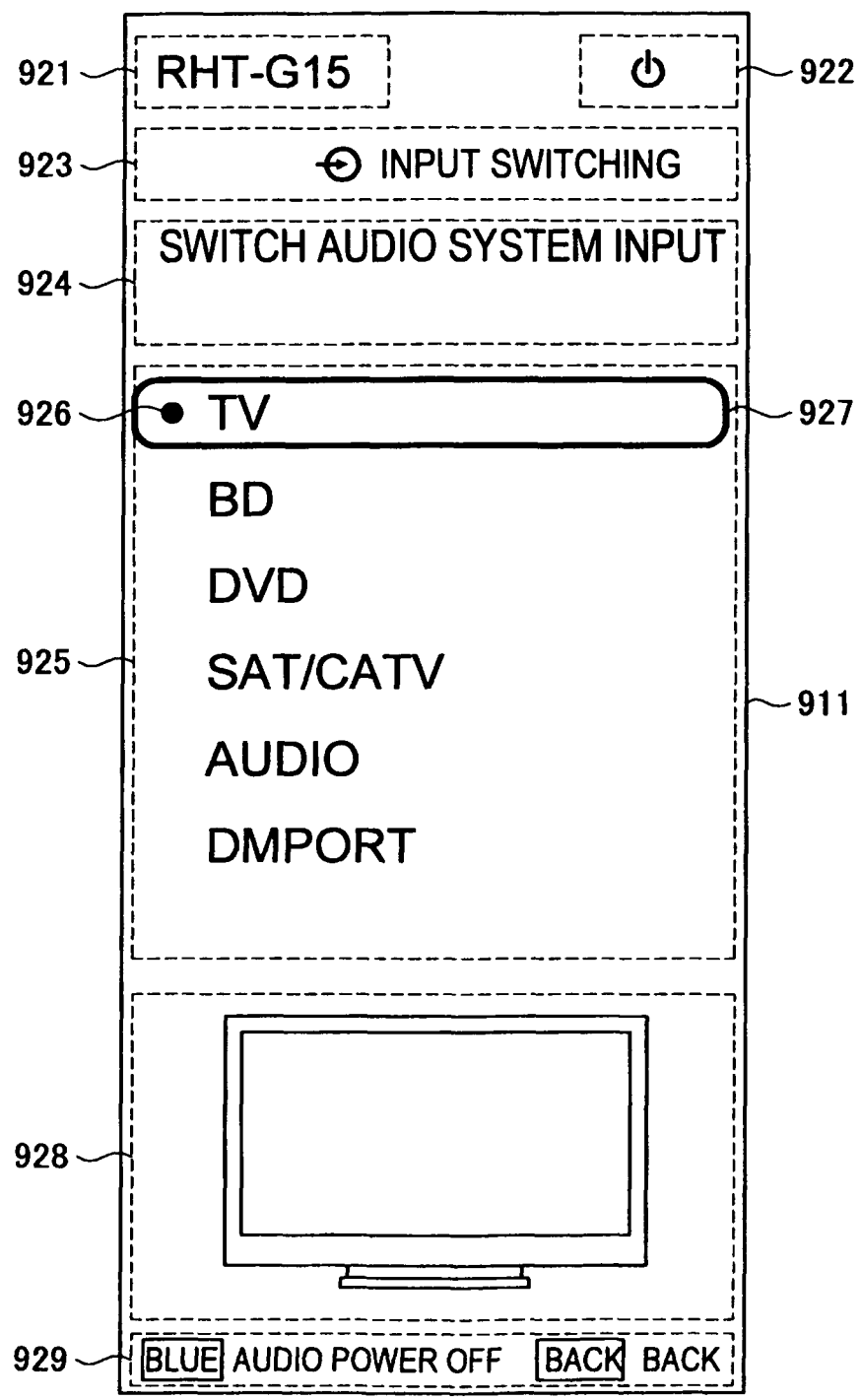
FIG. 14B illustrates an example of the screen displayed by the display panel.

FIG. 14B illustrates each portion of a screen of the audio device control application displayed in the application display area 911 shown in FIG. 14A. In FIG. 14B, dotted lines are for convenience of explanation, but not actually displayed.

An area indicated by reference numeral 921 is an area in which a model name (or a model number) of the AV amplifier 300 is displayed. The model name (or the model number) of the AV amplifier 300 displayed in the area indicated by reference numeral 921 is acquired by the television receiver 200 inquiring the AV amplifier 300 and receiving a reply from the AV amplifier 300. An area indicated by reference numeral 922 is an area in which a button for powering the AV amplifier 300 off is displayed. The user manipulates the remote controller 800 to move a cursor onto the button and presses the OK button 811, such that the CPU 231 can detect the manipulation of powering the AV amplifier 300 off and send a command to power the AV amplifier 300 off, thus powering the AV amplifier 300 off. An area indicated by reference numeral 923 is an area in which a tab for designating settings of the AV amplifier 300 to be changed is displayed. In the present embodiment, the audio input source of the AV amplifier 300, the sound field of the AV amplifier 300, and the sound quality of the AV amplifier 300 can be changed using the audio device control application. Reference numeral 924 is an area in which a sentence explaining the selected tab is displayed.

An area indicated by reference numeral 925 is an area in which information of the audio input sources of the AV amplifier 300 is displayed. The audio input sources of the AV amplifier 300 displayed in the area indicated by reference numeral 925 are acquired by the television receiver 200 inquiring the AV amplifier 300 and receiving a reply from the AV amplifier 300. The user can select one audio input source from among the audio input sources displayed in the area indicated by reference numeral 925 by manipulating the remote controller 800. Reference numeral 926 indicates an icon indicating a current audio input source of the AV amplifier 300. Reference numeral 927 indicates the cursor and represents a currently focused item.

An area indicated by reference numeral 928 is an area for displaying a video corresponding to the audio input source of the AV amplifier 300 focused with the currently focused item indicated by reference numeral 927. In FIG. 14B, since a "TV" is currently focused, a video imaging the television receiver is displayed in the area indicated by reference numeral 928. An area indicated by reference numeral 929 is an area in which a manipulation guide for the remote controller 800 is indicated. In FIG. 14B, when a Blue button of the remote controller 800 is pressed, the audio (AV amplifier 300) can be powered off, and when a Back button 814 of the remote controller 800 is pressed, the screen goes back to a previous screen, i.e., a normal mode screen, as displayed in the area indicated by reference numeral 929.

Figure 15:
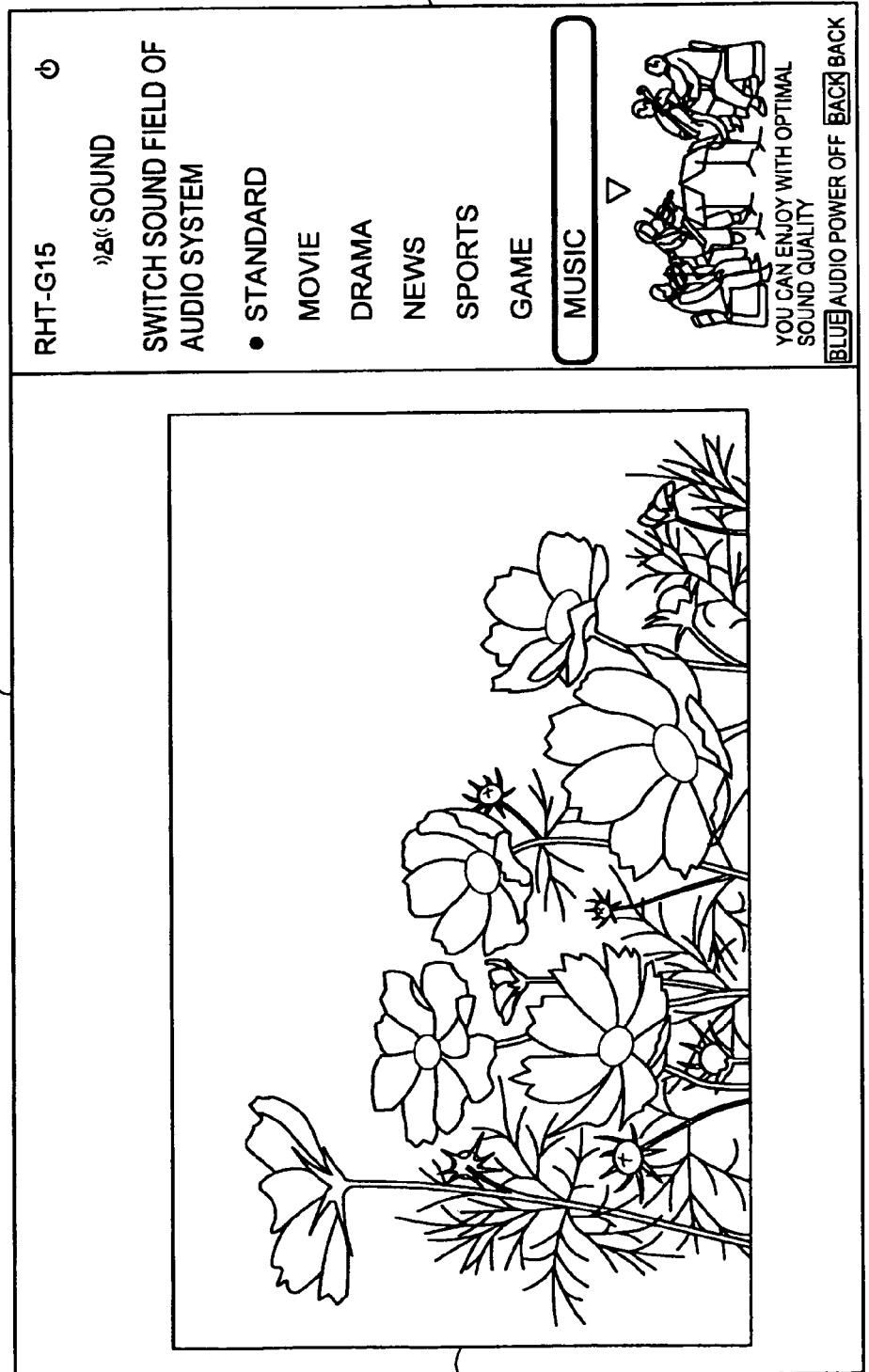
FIG. 15 illustrates an example of the screen displayed by the display panel.

FIG. 15 shows another example of the screen displayed on the display panel 216 when the audio device control application is in an active mode. In the example shown in FIG. 15, a screen for setting the sound field of the AV amplifier 300 is displayed in the application display area 911 of the display panel 216. The user can set the sound field of the AV amplifier 300 by manipulating the remote controller 800.

The user can cause the screen for setting the sound field of the AV amplifier 300 as shown in FIG. 15 to be displayed on the display panel 216 by pressing the Left button 812c or the Right button 812d of the remote controller 800.

Figure 16:
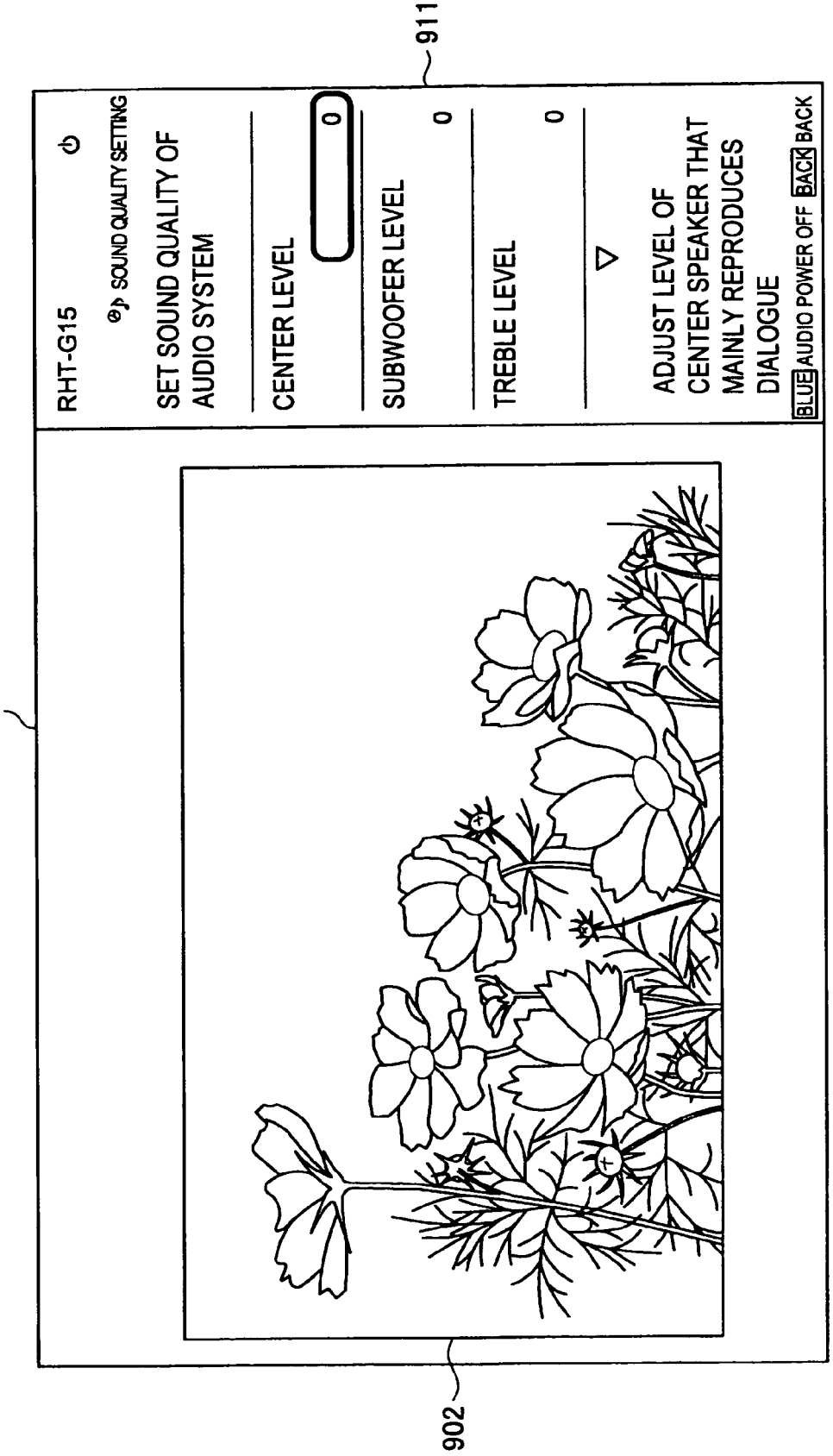
FIG. 16 illustrates an example of the screen displayed by the display panel.

FIG. 16 shows another example of the screen displayed on the display panel 216 when the audio device control application is in the active mode. In the example shown in FIG. 16, a screen for setting sound quality of sound output by the AV amplifier 300 is displayed in the application display area 911 of the display panel 216. The user can set the sound quality of the sound output by the AV amplifier 300 by manipulating the remote controller 800. Similarly, the user presses the Left button 812c or the Right button 812d of the remote controller 800 in order to cause the screen for setting the sound quality of the sound output by the AV amplifier 300 to be displayed on the display panel 216.

Figure 17:
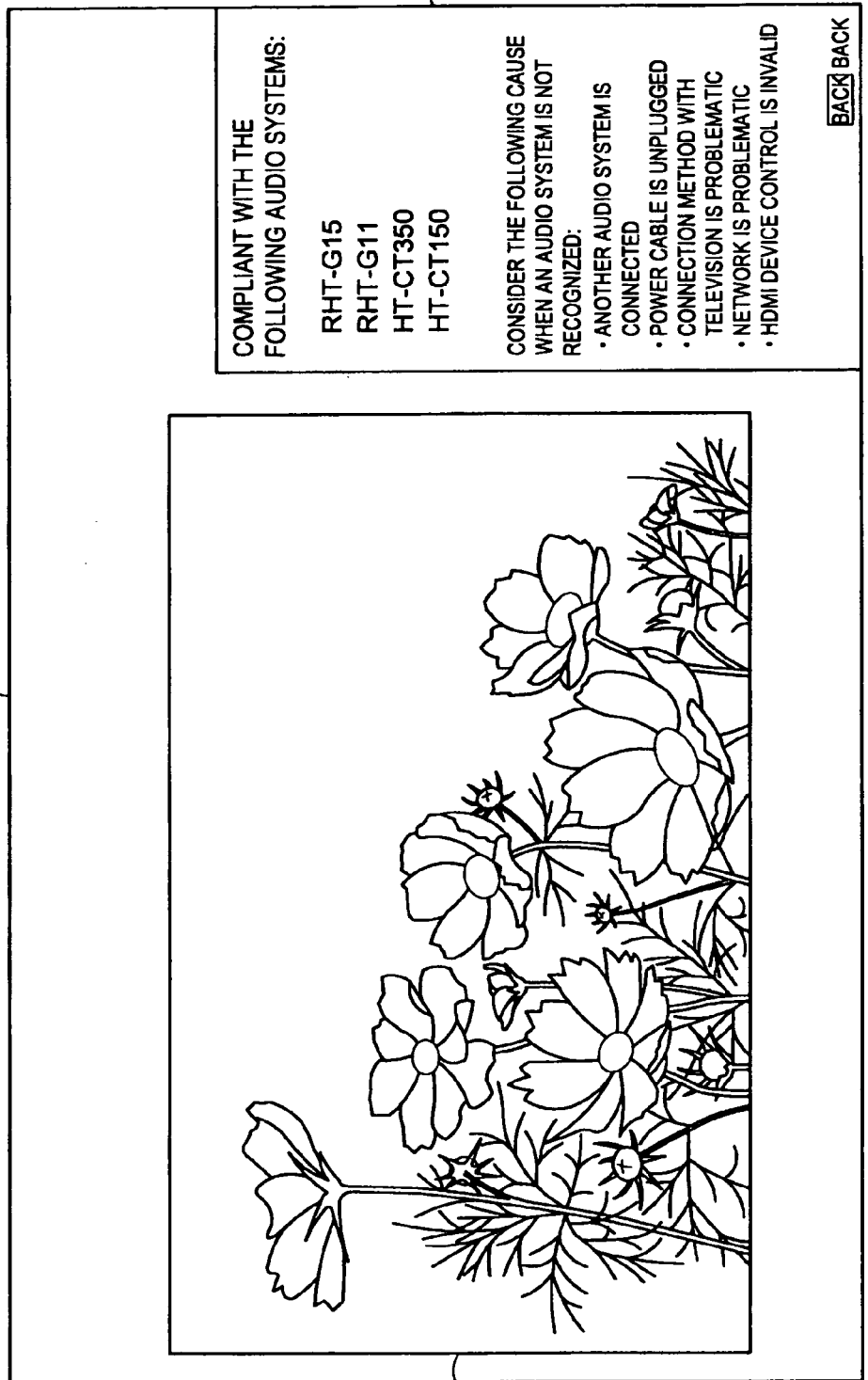
FIG. 17 illustrates an example of the screen displayed by the display panel.

FIG. 17 shows another example of the screen displayed on the display panel 216 when the audio device control application is in the active mode. FIG. 17 is an example of the screen displayed in the application display area 911 of the display panel 216 when the AV amplifier 300 connected to the television receiver 200 via the HDMI cable 701 is difficult to control by the audio device control application. Such a display is performed by the control of the CPU 231 when the connection of the AV amplifier 300 is difficult to confirm or when the connection can be confirmed but the connected AV amplifier 300 is a model that is difficult to control by the audio device control application, even when the television receiver 200 starts up the audio device control application. Displaying the screen shown in FIG. 17 on the display panel 216 enables the user to recognize that the AV amplifier 300 connected to the television receiver 200 via the HDMI cable 701 is difficult to control by the audio device control application.

Figure 18:
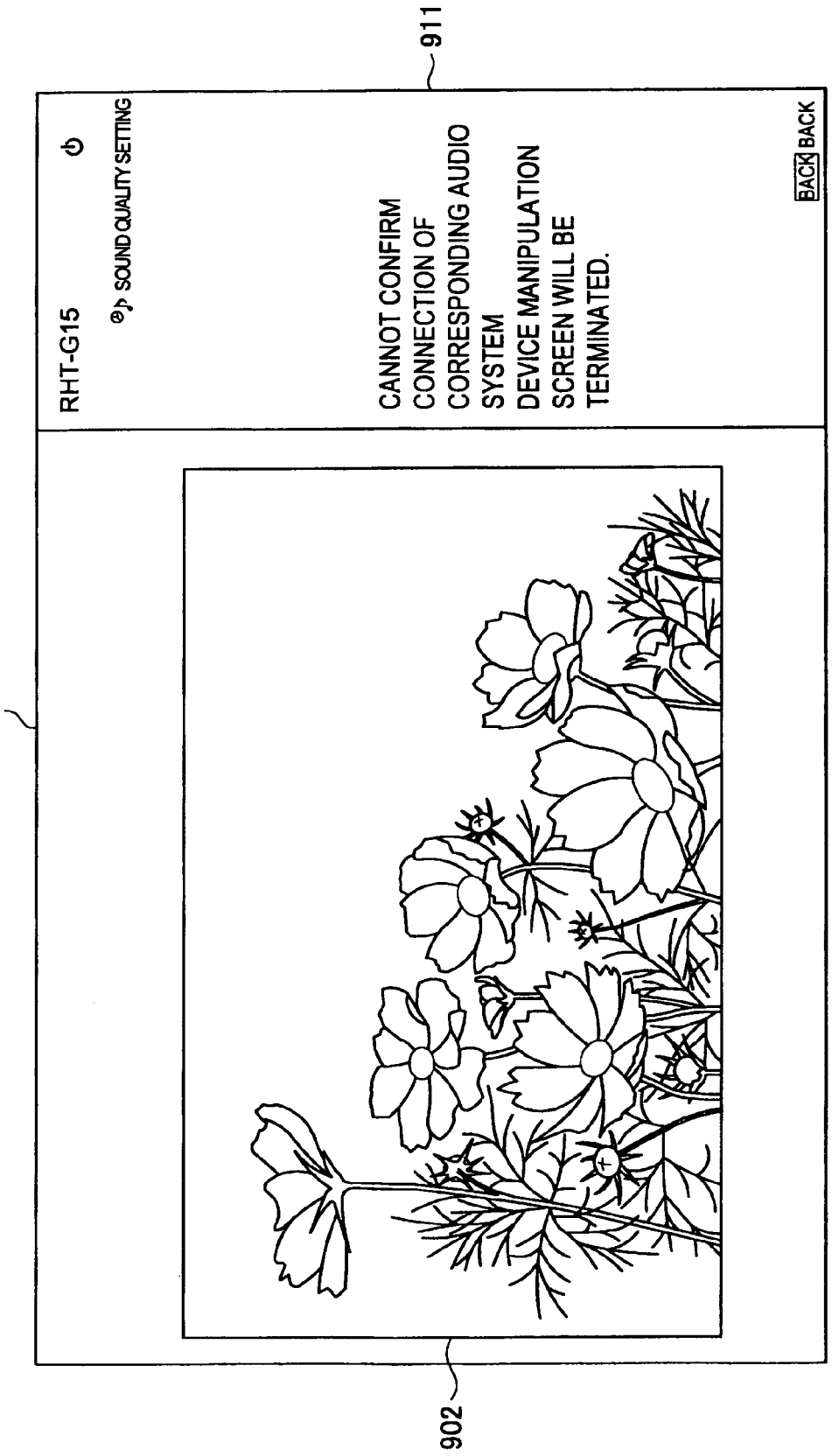
FIG. 18 illustrates an example of the screen displayed by the display panel.

FIG. 18 shows another example of the screen displayed on the display panel 216 when the audio device control application is in the active mode. FIG. 18 is an example of the screen displayed in the application display area 911 of the display panel 216 when the HDMI cable 701 connecting between the television receiver 200 and the AV amplifier 300 is unplugged from the television receiver 200 or the AV amplifier 300 and the television receiver 200 may not recognize the connection of the AV amplifier 300 in the case in which the audio device control application is in the active mode. In this case, when a given time elapses after the screen as shown in FIG. 18 is displayed in the application display area 911 of the display panel 216, the audio device control application automatically transitions to the normal mode. In the case in which the audio device control application is in the active mode, when the AV amplifier 300 connected to the television receiver 200 via the HDMI cable 701 is powered off, not by audio device control application (i.e., when the AV amplifier 300 is directly powered off), a screen different from that shown in FIG. 18 may be displayed in the application display area 911 of the display panel 216.

Figure 19:
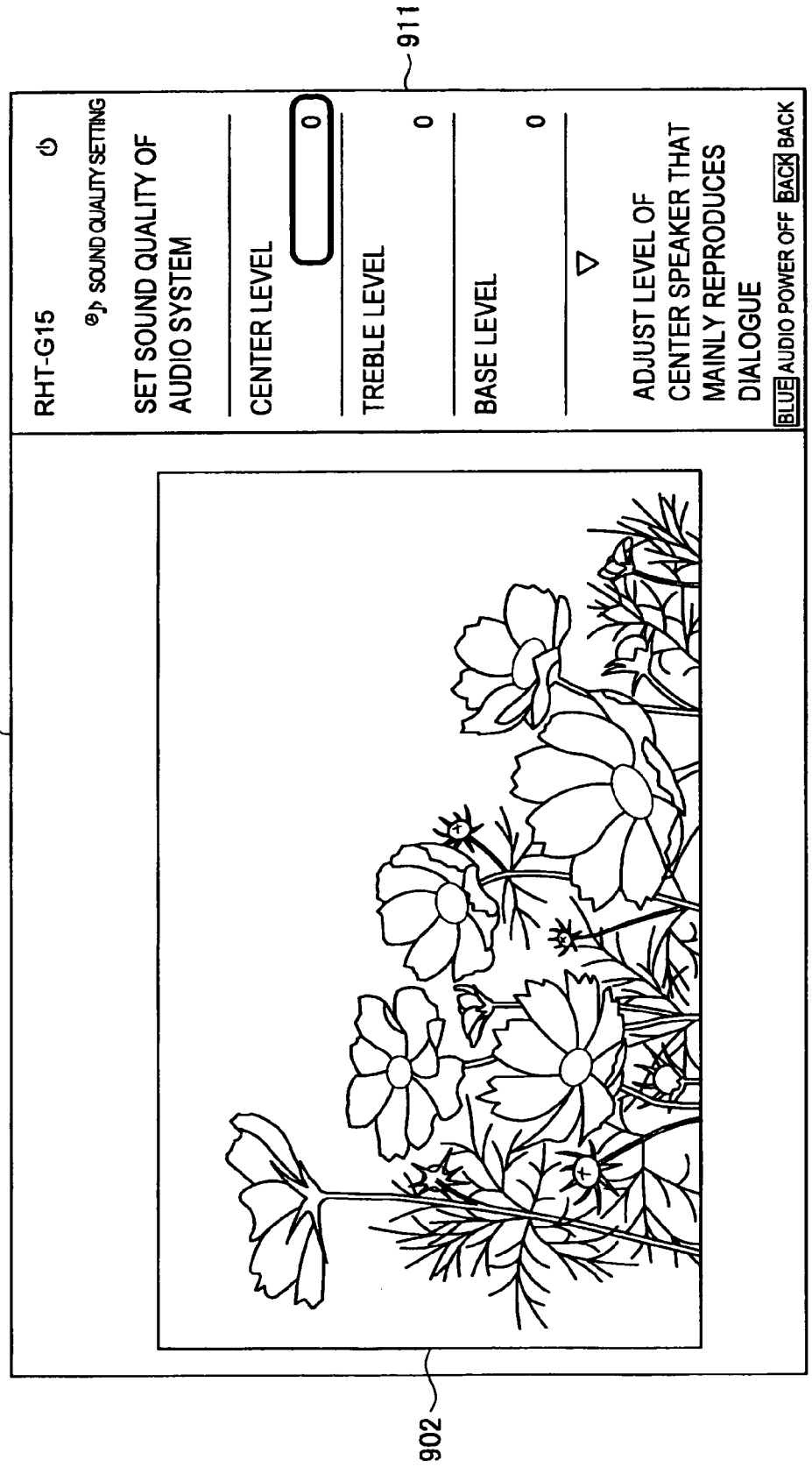
FIG. 19 illustrates an example of the screen displayed by the display panel.

The audio device control application may cause different screens to be displayed according to states of the AV amplifier 300 connected to the television receiver 200 via the HDMI cable 701. FIG. 19 shows another example of the screen displayed on the display panel 216 when the audio device control application is in the active mode. In FIG. 19, the screen for setting the sound quality of the sound output by the AV amplifier 300 is displayed in the application display area 911 of the display panel 216, as in FIG. 16. However, a view shown in FIG. 19 differs from that shown in FIG. 16 in contents of setting items. Thus, the audio device control application executed by the CPU 231 can cause different screens to be displayed according to the models or states of the AV amplifier 300 connected to the television receiver 200.

The contents of the screen displayed on the display panel 216 by the television receiver 200 executing the application properly provided from the application server 12 have been described. Operation of the television receiver 200 and the AV amplifier 300 will now be described with reference to the drawings.

Figure 20:
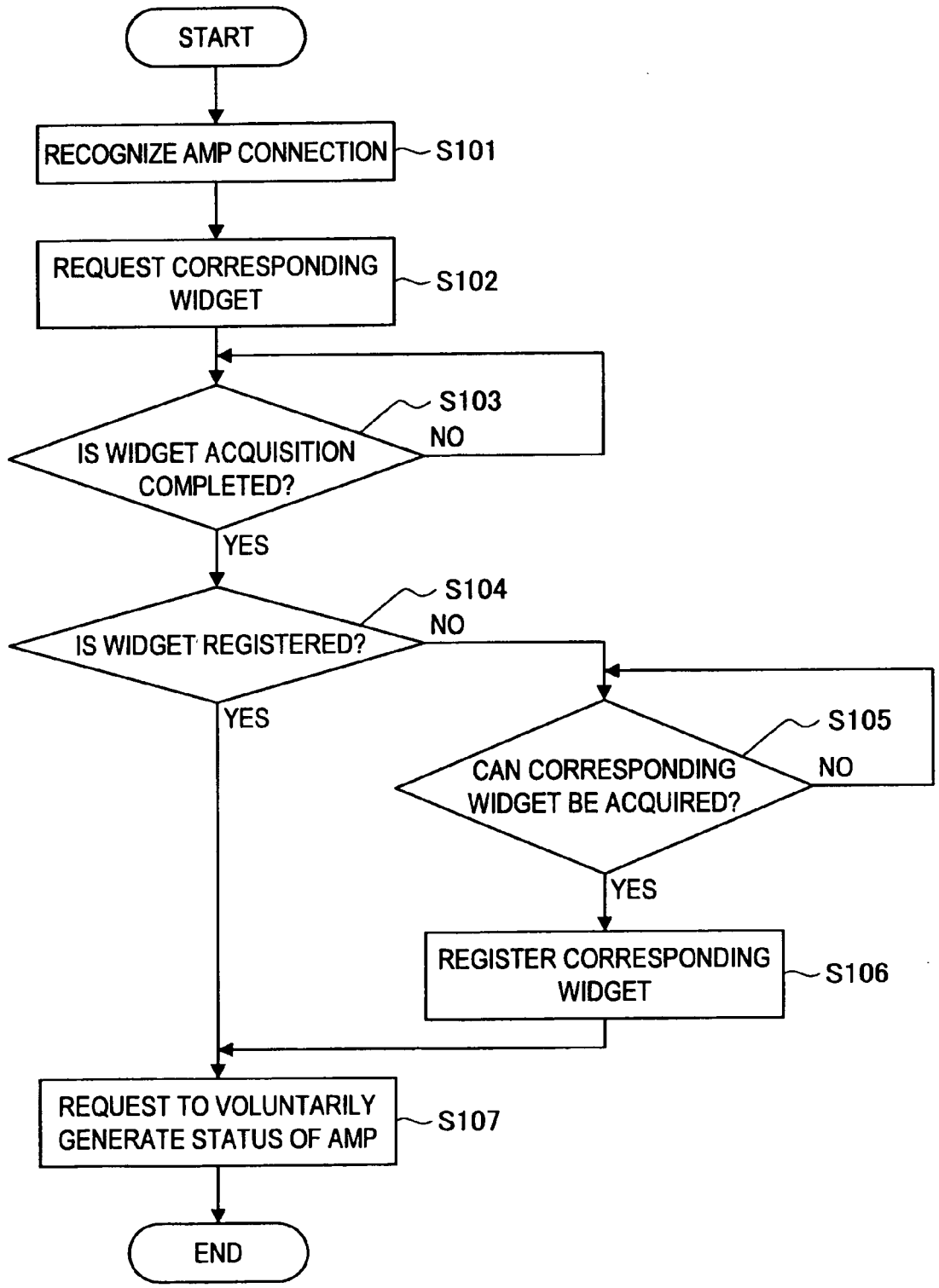
FIG. 20 is a flowchart showing an operation example of a television receiver according to an embodiment of the present invention.

FIG. 20 is a flowchart showing an operation of the television receiver 200 when the AV amplifier 300 is connected to the television receiver 200 via the HDMI cable 701. FIG. 20 shows an operation when HDMI device control of the television receiver 200 (the control by the television receiver 200 of the device directly or indirectly connected to the television receiver 200 via the HDMI cable) is valid.

When the AV amplifier 300 is connected to the television receiver 200 via the HDMI cable 701, the television receiver 200 can recognize the connection of the AV amplifier 300 (step S101). Specifically, when the AV amplifier 300 is connected to the television receiver 200 via the HDMI cable 701, the HPD terminal is changed from a low level to a high level, and the HDMI receiving unit 307 of the AV amplifier 300 acquires a physical address and performs a polling operation to acquire a logical address. At this timing, the AV amplifier 300 performs transmission, by broadcast, using a logical address 5 by means of a report physical address to notify a CEC compliant device connected via the HDMI cable of its existence. The television receiver 200 confirms a location of the AV amplifier 300 based on the notification of the report physical address from the logical address of the AV amplifier 300 or polling periodically transmitted by the television receiver 200. Thus, the television receiver 200 recognizes the connection of the AV amplifier 300.

When the television receiver 200 recognizes the connection of the AV amplifier 300 in step S101, the television receiver 200 requests the AV amplifier 300 to provide information of an audio device control application (hereinafter, also referred to as a "widget") to which the AV amplifier 300 corresponds in order to discriminate whether the AV amplifier 300 connected to the television receiver 200 can be controlled by an audio device control application (step S102). The television receiver 200 waits for a given time until there is a replay of the information of the corresponding widget from the AV amplifier 300 (step S103). The television receiver 200 recognizes from the reply from the AV amplifier 300 whether the connected AV amplifier 300 is a model corresponding to the widget or what the corresponding widget is. When the information of the corresponding widget from the AV amplifier 300 is replied, the television receiver 200 determines whether the corresponding widget replied from the AV amplifier 300 has been registered in the application list of the television receiver 200 (step S104).

When the corresponding widget replied from the AV amplifier 300 is not registered in the application list of the television receiver 200 as a result of the determination in step S104, the television receiver 200 accesses the application server 12 and waits until the television receiver 200 can acquire the corresponding widget (step S105). When the television receiver 200 can acquire the corresponding widget from the application server 12, the television receiver 200 registers the corresponding widget in the application list (step S106).

When the corresponding widget of the AV amplifier 300 is registered in the application list of the television receiver 200, the television receiver 200 transmits a message for designating a status voluntary generation request as ON to the AV amplifier 300 (step S107). When the AV amplifier 300 receives the message, the AV amplifier 300 can voluntarily generate a status corresponding to the widget and continues to voluntarily generate the status until receiving a message to designate the status voluntary generation request as OFF from the television receiver 200.

To cope with an application for controlling an operation of the AV amplifier 300 from the television receiver 200, it is necessary for the AV amplifier 300 to properly notify the television receiver 200 of its current state. Accordingly, an increase in a traffic load due to a vendor specific command being issued often from the AV amplifier 300 is a concern. In the present embodiment, the AV amplifier 300 is set to voluntarily generate its status at a time when the television receiver 200 initiates the execution of the audio device control application and not to voluntarily generate the status at a time when the execution is terminated. Accordingly, it is possible to suppress traffic increase between the television receiver 200 and the AV amplifier 300 and reduce the traffic load.

While the operation by the user of the widget registered in the television receiver 200 can be performed at any timing, usually, the manipulation of the AV amplifier 300 is not considered as being performed during an entire period in which the television receiver 200 is being used. When widget-corresponding devices are connected to each other and the AV amplifier 300 is manipulated, it is necessary to notify the widget of a correct state of the AV amplifier 300, but the notification may be performed only when the widget starts up. Typically, when the status is voluntarily generated from the AV amplifier 300, there is a possibility that CEC traffic load increases, a normal CEC operation timing is (perhaps slightly) delayed, and manipulation sensation of the user is degraded. Accordingly, when the status voluntary generation is unnecessary, the AV amplifier 300 is caused not to perform the status voluntary generation. Accordingly, the television receiver 200 transmits the status voluntary generation request of ON and OFF to the AV amplifier 300 upon the widget startup and the widget termination.

Figure 21:
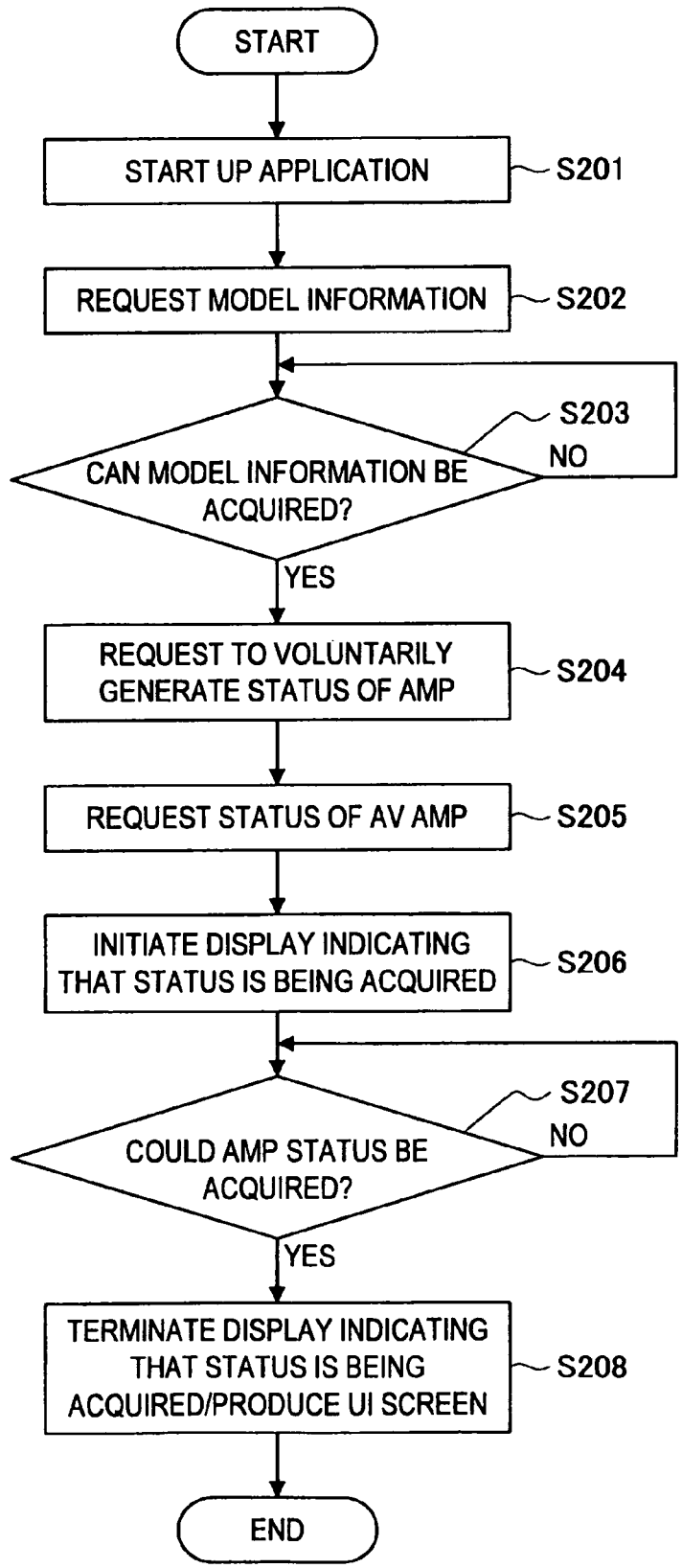
FIG. 21 is a flowchart showing an operation example of the television receiver according to an embodiment of the present invention.

FIG. 21 is a flowchart showing an operation of the television receiver 200 when the audio device control application is executed in the television receiver 200. The audio device control application can be executed in the television receiver 200, for example, from the initial screen as shown in FIG. 11.

When the television receiver 200 tries to execute the audio device control application properly provided from the application server 12 (step S201), a function of the audio device control application causes the television receiver 200 to inquire about the model information of the AV amplifier 300 to the AV amplifier 300 (step S202). The model information of the AV amplifier 300 includes, for example, information on the model of the AV amplifier 300, information on a seller of the AV amplifier 300, and the like. The television receiver 200 waits for a given time until there is a reply of the model information of the AV amplifier 300 from the AV amplifier 300 (step S203).

When there is the reply of the model information of the AV amplifier 300 from the AV amplifier 300, the television receiver 200 transmits a message for designating a status voluntary generation request as ON to the AV amplifier 300 (step S204). This is the same as the process in step S107 described above. A process in the television receiver 200 shown in FIG. 21 may be performed subsequent to the process shown in FIG. 20, but since the audio device control application can be executed at any timing, even at this time, the television receiver 200 transmits the message for designating a status voluntary generation request as ON to the AV amplifier 300.

When the message for designating the status voluntary generation request as ON is transmitted in step S204, the television receiver 200 then requests the AV amplifier 300 to reply with a current status (step S205). The AV amplifier 300 replies with the current state to the television receiver 200 in a state reply process, which will be described later, but the television receiver 200 may execute a process of displaying an indication that the television receiver 200 is acquiring the status of the AV amplifier 300 on the display panel 216 using the audio device control application until there is the reply from the AV amplifier 300 (step S206).

The television receiver 200 waits for a given time until there is the reply of the current state of the AV amplifier 300 from the AV amplifier 300 (step S207). When there is the reply of the current state of the AV amplifier 300 from the AV amplifier 300, if the audio device control application is executing a display of the indication that the television receiver 200 is acquiring the state of the AV amplifier 300, the television receiver 200 stops displaying and executes displaying of an appropriate user interface using the audio device control application based on the model of the AV amplifier 300, and the current state of the AV amplifier 300 replied from the AV amplifier 300 (step S208).

Figure 22:
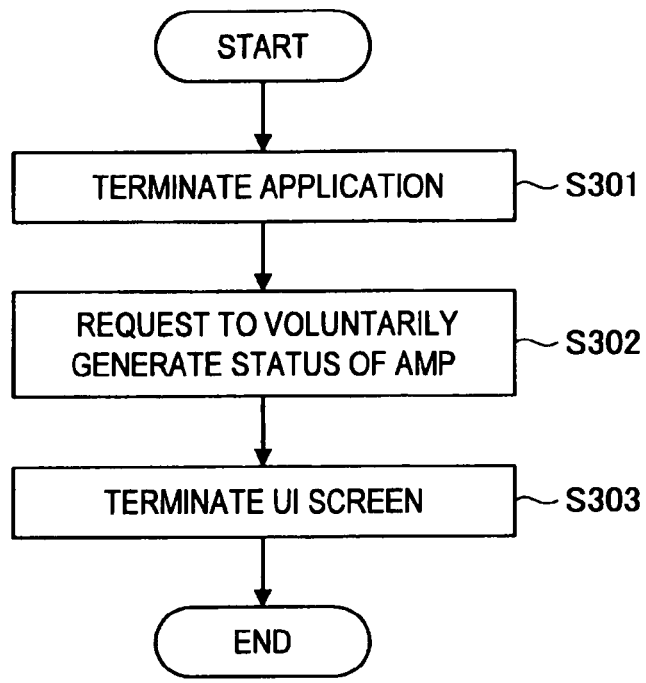
FIG. 22 is a flowchart showing an operation example of the television receiver according to an embodiment of the present invention.

FIG. 22 is a flowchart showing an operation of the television receiver 200 when the television receiver 200 terminates the execution of the audio device control application.

When the television receiver 200 tries to terminate the execution of the audio device control application (step S301), the television receiver 200 first transmits a message to the AV amplifier 300 to designate the status voluntary generation request as OFF (step S302). The transmission of the message to designate the status voluntary generation request as OFF to the AV amplifier 300 enables status voluntary generation from the AV amplifier 300 to be stopped and the CEC traffic load to be reduced.

With the termination of the execution of the audio device control application, the display of the user interface screen by the audio device control application stops, and for example, the initial screen as shown in FIG. 11 is displayed on the display panel 216 of the television receiver 200.

Figure 23:
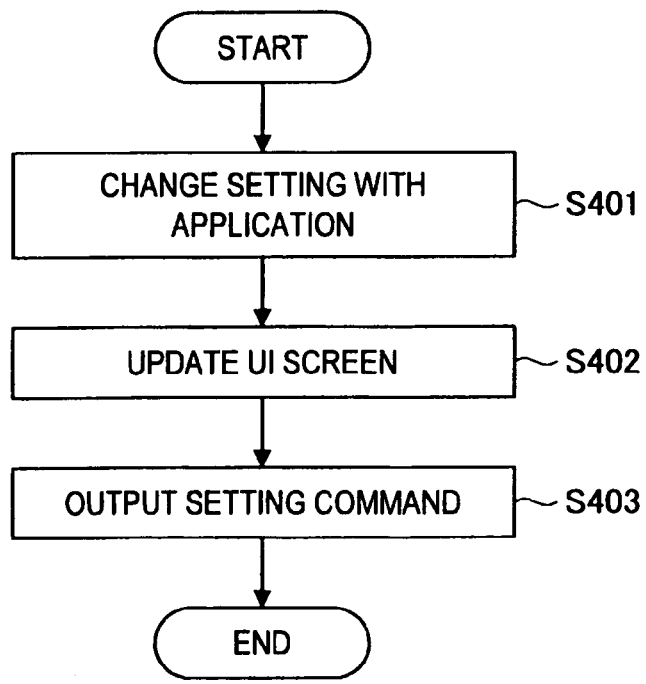
FIG. 23 is a flowchart showing an operation example of the television receiver according to an embodiment of the present invention.

FIG. 23 is a flowchart showing an operation of the television receiver 200 when the television receiver 200 changes a setting of the AV amplifier 300 using the audio device control application.

When the television receiver 200 tries to change the setting of the AV amplifier 300 using the audio device control application (step S401), the television receiver 200 updates the user interface screen that the audio device control application displays on the display amplifier 216, based on the manipulation by the user of the remote controller 800 (step S402). Together with the update of the user interface screen, the television receiver 200 transmits a command to the AV amplifier 300 to change the setting into a setting according to the user interface screen. The AV amplifier 300 having received the command from the television receiver 200 changes the setting into the setting according to the contents of the command.

Figure 24:
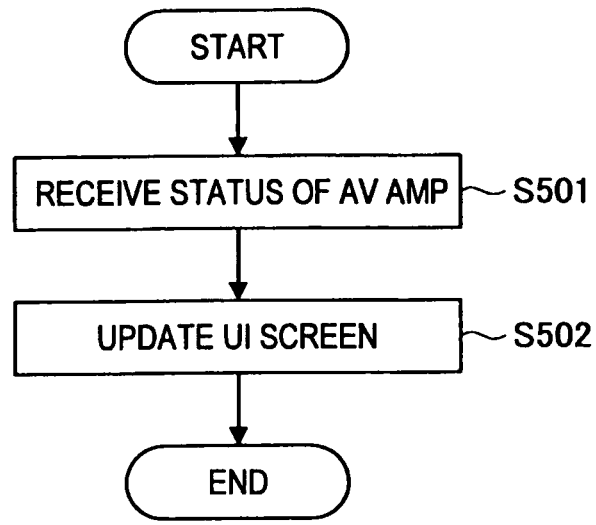
FIG. 24 is a flowchart showing an operation example of the television receiver according to an embodiment of the present invention.

While the setting of the AV amplifier 300 can be changed through the audio device control application, the setting of the AV amplifier 300 may be directly changed. When the setting of the AV amplifier 300 is directly changed, it is preferable that the changed contents of the setting are transmitted from the AV amplifier 300 to the television receiver 200 to update the screen display. FIG. 24 is a flowchart showing an operation of the television receiver 200 when the television receiver 200 receives the setting of the AV amplifier 300 in the case in which the television receiver 200 is executing the audio device control application.

When the television receiver 200 receives the setting of the AV amplifier 300 (step S501), the audio device control application updates the user interface screen displayed on the display panel 216 based on the contents of the setting of the AV amplifier 300 (step S502). Such update of the display enables the television receiver 200 to confirm the set contents of the AV amplifier 300 even when the setting of the AV amplifier 300 is directly changed.

Figure 25:
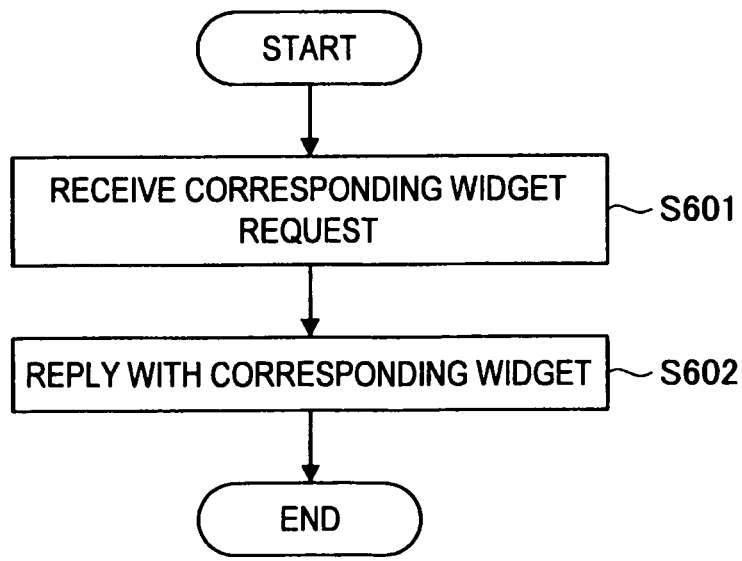
FIG. 25 is a flowchart showing an operation example of an AV amplifier according to an embodiment of the present invention.

FIG. 25 is a flowchart showing a process when the AV amplifier 300 receives a request for information of the corresponding widget from the television receiver 200, in which a process executed by the AV amplifier 300 after the television 200 executes the process in step S102 of FIG. 20 is shown.

When the AV amplifier 300 receives a request for information of the corresponding widget from the television receiver 200 (step S601), the AV amplifier 300 replies with the information of the corresponding widget stored in the AV amplifier 300 to the television receiver 200 (step S602). The television receiver 200 can download an appropriate widget from the application server 12 to control the AV amplifier 300 by receiving the information of the corresponding widget from the AV amplifier 300.

Figure 26:
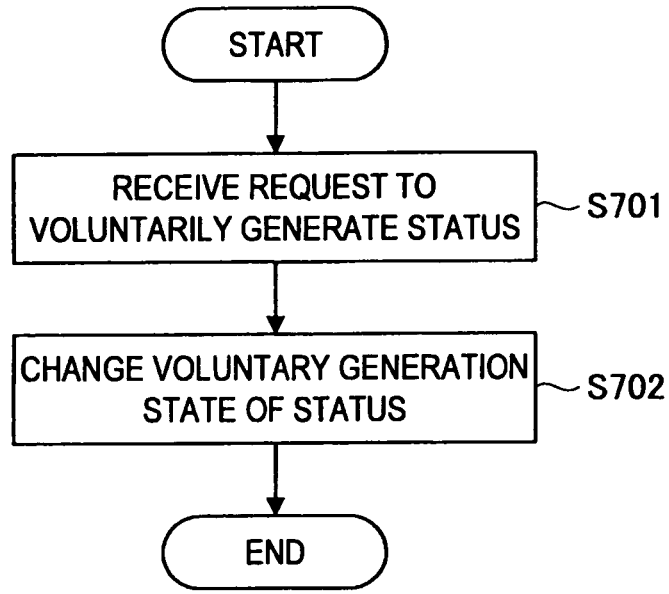
FIG. 26 is a flowchart showing an operation example of the AV amplifier according to an embodiment of the present invention.

FIG. 26 is a flowchart showing a process when the AV amplifier 300 receives a message from the television receiver 200 to designate a change of the status voluntary generation request, in which a process executed by the AV amplifier 300 after the television 200 executes the processes in step S107 of FIG. 20, step S204 of FIG. 21 and step S302 of FIG. 22 is shown.

When the AV amplifier 300 receives the message from the television receiver 200 to designate a change of the status voluntary generation request (step S701), the AV amplifier 300 changes the setting of the status voluntary generation request based on the received message (step S702). That is, when the television receiver 200 executes the processes in step S107 of FIG. 20 and step S204 of FIG. 21 and transmits a message to the AV amplifier 300 to designate the status voluntary generation request to ON, the AV amplifier 300 sets the status voluntary generation state to ON. On the other hand, when the television receiver 200 executes the process in step S302 in FIG. 22 and transmits a message to the AV amplifier 300 to designate the status voluntary generation request as OFF, the AV amplifier 300 sets the status voluntary generation state to OFF.

Thus, the AV amplifier 300 voluntarily generates the status of the AV amplifier 300 only when the status voluntary generation request is ON when receiving the message from the television receiver 200 to designate the change of the status voluntary generation request, thus suppressing the CEC traffic load.

Figure 27:
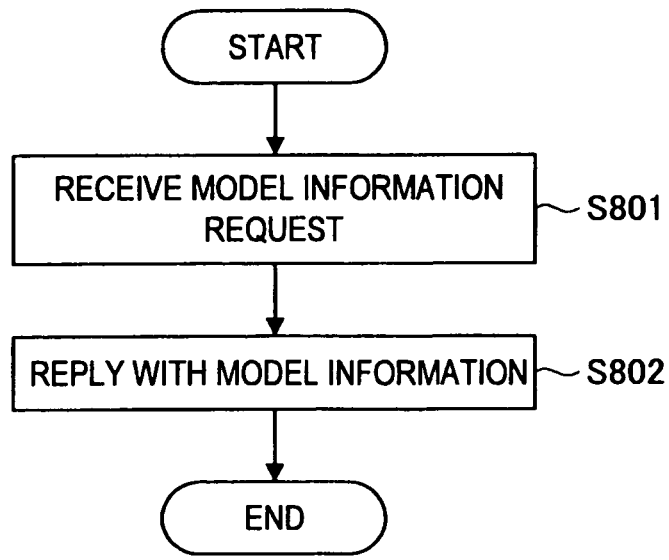
FIG. 27 is a flowchart showing an operation example of the AV amplifier according to an embodiment of the present invention.

FIG. 27 is a flowchart showing a process when the AV amplifier 300 receives an inquiry about model information from the television receiver 200, in which a process executed by the AV amplifier 300 after the television receiver 200 executes the process in step S202 of FIG. 21 is shown.

When the AV amplifier 300 receives an inquiry about the model information from the television receiver 200 (step S801), the AV amplifier 300 replies with its model information to the television receiver 200 based on the received message (step S802). The AV amplifier 300 may reply information of a model ID for uniquely specifying the model to the television receiver 200, in addition to the model information. Accordingly, the television receiver 200 can dynamically change the operation of the widget downloaded from the application server 12 so that it can operate for each model, based on the model information replied from the AV amplifier 300. For example, the widget run in the television receiver 200 can display the model name according to the AV amplifier 300 connected to the television receiver 200 on the display panel 216 using the model information replied from the AV amplifier 300.

Figure 28:
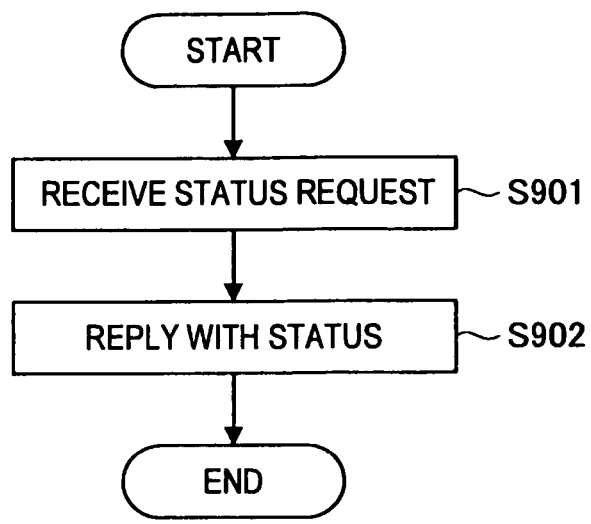
FIG. 28 is a flowchart showing an operation example of the AV amplifier according to an embodiment of the present invention.

FIG. 28 is a flowchart showing a state reply process when the AV amplifier 300 receives a current status request from the television receiver 200, in which a process executed by the AV amplifier 300 after the television receiver 200 executes the process in step S205 of FIG. 21 is shown.

When the AV amplifier 300 receives a current status request from the television receiver 200 (step S901), the AV amplifier 300 replies with information of its current status to the television receiver 200 based on the received message (step S902). For example, settings of a current audio input source and a current sound field and a setting of current sound quality may be included in the current status information is replied by the AV amplifier 300. When the AV amplifier 300 replies with the current status information to the television receiver 200, the widget run in the television receiver 200 can display the information of the current status of the AV amplifier 300 on the display panel 216.

Figure 29:
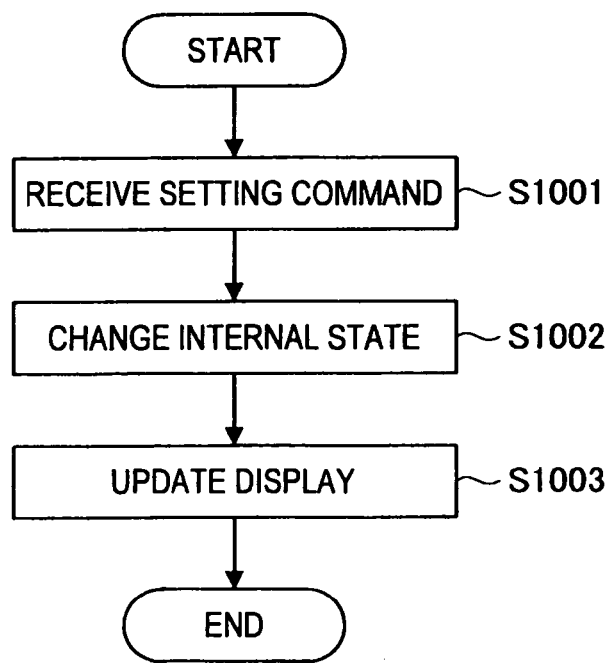
FIG. 29 is a flowchart showing an operation example of the AV amplifier according to an embodiment of the present invention.

FIG. 29 is a flowchart showing a process when the AV amplifier 300 receives a command from the television receiver 200 to change the current status, in which a process executed by the AV amplifier 300 after the television receiver 200 executes the process in step S403 of FIG. 23 is shown.

When the AV amplifier 300 receives the command from the television receiver 200 to change the current status (step S1001), the AV amplifier 300 changes the current status based on the received command (step S1002). When the AV amplifier 300 changes the current status, the AV amplifier 300 changes the display on the display unit 325, as necessary (step S1003). Thus, it is possible to change the status of the AV amplifier 300 based on the command transmitted from the widget run in the television receiver 200.

Figure 30:
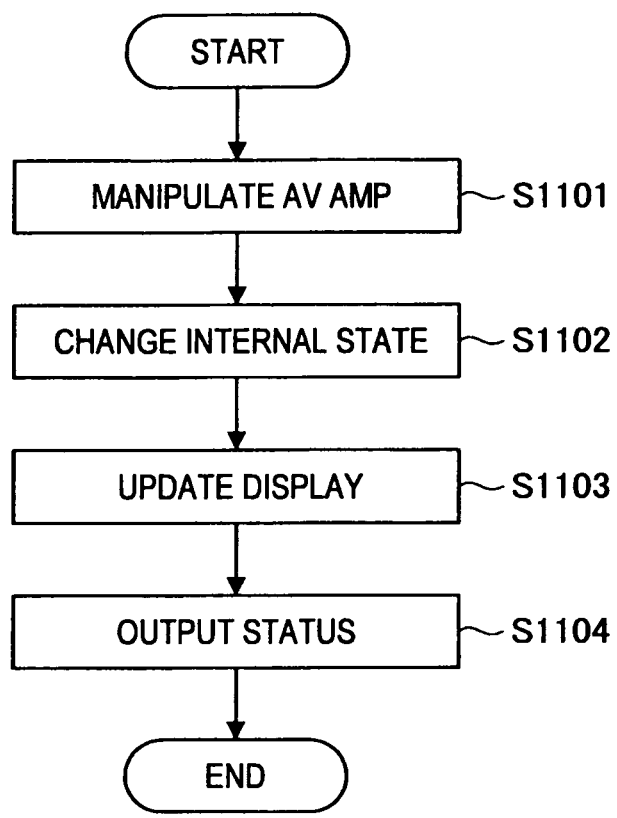
FIG. 30 is a flowchart showing an operation example of the AV amplifier according to an embodiment of the present invention.

FIG. 30 is a flowchart showing a process when the AV amplifier 300 is manipulated directly, not by the television receiver 200, and the current status of the AV amplifier 300 is changed.

When the AV amplifier 300 is directly manipulated (step S1101) and a current internal state of the AV amplifier 300 is changed (step S1102), the display on the display unit 325 is changed as necessary (step S1103), and then, when the status voluntary generation request remains ON, the AV amplifier 300 transmits information of the changed status toward the television receiver 200 (step S1104).

Thus, when the AV amplifier 300 is directly operated and the current status of the AV amplifier 300 is changed, the AV amplifier 300 transmits the information of the changed status to the television receiver 200, such that the displayed contents on the display panel 216 by the widget run in the television receiver 200 can be changed. For example, when the widget is being run in the television receiver 200, it is possible to display the changed contents on the display panel 216 even in the case in which the setting of the audio input source or the sound field is changed using the remote controller of the AV amplifier 300.

The operations of the television receiver 200 and the AV amplifier 300 have been described with reference to the drawings. Next, contents of the command exchanged between the television receiver 200 and the AV amplifier 300 will be illustrated.

In the present embodiment, the command exchanged between the television receiver 200 and the AV amplifier 300 is a vendor specific command defined by each vendor.

Figure 31:
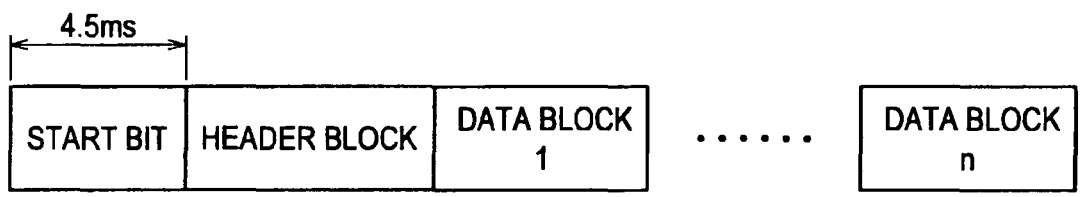
FIG. 31 shows a block structure of data transmitted via a CEC line (CEC channel)
Figure 32:
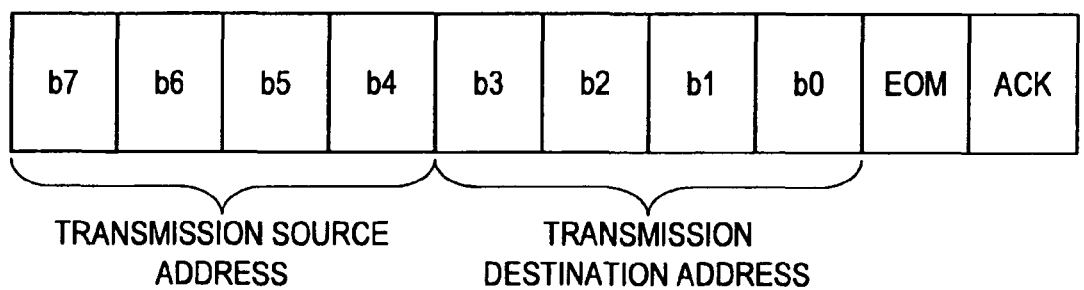
FIG. 32 shows a data structure example of a header block.

FIG. 31 shows a block structure of data transmitted via a CEC line (CEC channel). The data has a structure in which one block is transmitted for 4.5 ms via the CEC line. In data transmission initiation, a start bit is arranged, a header block is arranged, and then any number (n) of data blocks including data to be actually transmitted are arranged. FIG. 32 shows an example of a data structure of the header block. A logical address (source address) of a transmission source and a logical address (sink address) of a transmission destination are arranged in the header block.

In general, the CEC message has a structure in which a maximum of sixteen 10-bit data are connected. Among the 10 bits, last 2 bits include an EOM bit indicating that it is a last bit, and an ACK bit indicating that the message is recognized, as shown in FIG. 32. Accordingly, hereinafter, first 8 bits of the 10-bit data are treated as one byte.

A first one byte of the CEC command includes 4 bits in which a logical address of a command transmission source is stored, and 4 bits in which a logical address of a command transmission destination is stored. As shown in FIG. 2, the television receiver, generally, has a logical address designated as 0 and the AV amplifier has a logical address designated as 5. Further, command transmission methods include broadcast by which transmission is performed from one device to all devices, and unicast by which transmission is performed from one device to a device having a specific logical address.

Figure 33:
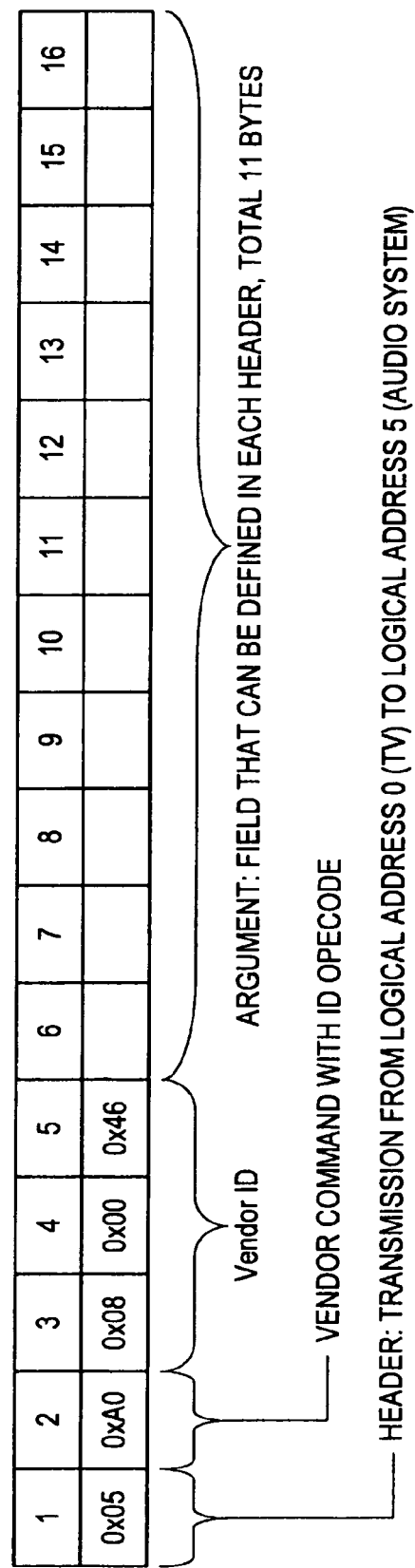
FIG. 33 shows a data example of a command.

FIG. 33 illustrates a data structure of a command exchanged between the television receiver 200 and the AV amplifier 300 (a vendor specific command; hereinafter, also referred to simply as a command).

A transmission source and a transmission destination of the command are stored in the 1st byte, as described above. In the example shown in FIG. 33, a transmission from a device having the logical address of 0 (i.e. the television receiver 200) to a device having the logical address of 5 (i.e. the AV amplifier 300) is shown.

The 2nd byte indicates an opcode, and a vendor ID for uniquely identifying a vendor is stored in subsequent 3 bytes, as shown. The vendor ID for uniquely identifying the vendor is stored in the 3rd to 5th bytes. The 6th byte and subsequent bytes form an area that can be freely defined and used by each vendor. In the present embodiment, the 6th and 7th bytes are used to store the opecode of the command, and the 8th to 16th bytes are used to store an operand.

The command having such a data structure is exchanged between the television receiver 200 and the AV amplifier 300 connected via the HDMI cable 701, such that the television receiver 200 can execute the control of the AV amplifier 300 and the AV amplifier 300 can transmit information of various current statuses to the television receiver 200.

FIG. 34 illustrates an example of data structures of commands exchanged between the television receiver 200 and the AV amplifier 300. In FIG. 34, an example of data structures of a status request command from the television receiver 200 to the AV amplifier 300, a status notification command from the AV amplifier 300 to the television receiver 200, and a status setting command from the television receiver 200 to the AV amplifier 300 is shown.

The data structure example shown in FIG. 34 shows that the command is the command to request a current status from the television receiver 200 to the AV amplifier 300 when the opecode defined in the 6th and 7th bytes of the command is "0x0000," the command to notify the current status from the AV amplifier 300 to the television receiver 200 when the opecode is "0x0001," and the setting command from the television receiver 200 to the AV amplifier 300 when the opecode is "0x0002."

Data of each byte of the status notification command from the AV amplifier 300 to the television receiver 200 and the status setting command from the television receiver 200 to the AV amplifier 300 shown in FIG. 34 will be described. The 8th byte relates to a setting of sound quality of a center speaker, the 9th byte relates to a setting of sound quality of a subwoofer. The 10th and 11th bytes relates to a setting of sound quality of a left front speaker and a right speaker, respectively, and the 12th and 13th bytes relates to a setting of sound quality of a left surround speaker and a right surround speaker. The 14th byte and subsequent bytes are not used for such commands.

In the present embodiment, each byte shown in FIG. 34 has a signed value and takes a value of a 0.5 dB step in a range from −20 dB to +20 dB. For items having no function and items for which settings are not changed, an invalid value (e.g., "0x80") is set in corresponding bytes for transmission.

When the AV amplifier 300 notifies, using a command, television receiver 200, for example, that the sound quality of the center speaker is +0 dB, the sound quality of the subwoofer is +1 dB, the sound quality of the left front speaker is −2 dB, the sound quality of the right front speaker is +3 dB, and the surround speakers have no function, the AV amplifier 300 transmits the command as "0x00 0x01 0x00 0x02 0xFC 0x06 0x80 0x80" in order from the 8th byte.

When the television receiver 200 notifies, using a command, the AV amplifier 300, for example, that the sound quality of the center speaker is set to +0 dB, the sound quality of the subwoofer is set to +1 dB, the sound quality of the left front speaker is −2 dB, the sound quality of the right front speaker set to +3 dB, and the surround speakers are not set because of having no function, the television receiver 200 transmits the command as "0x00 0x02 0x00 0x02 0xFC 0x06 0x80 0x80" in order from the 8th byte.

When the television receiver 200 notifies the AV amplifier 300, for example, that only the sound quality of the center speaker is set to +4 dB and the sound qualities of the other speakers are not changed (the surround speakers are not set because of having no function), the television receiver 200 transmits the command as "0x00 0x02 0x08 0x80 0x80 0x80 0x80 0x80" in order from the 8th byte. When the AV amplifier 300 replies with the current status to the television receiver 200 after receiving the command from the television receiver 200 and changing the setting, the AV amplifier 300 replies with fields having changed values as well as current values. Thus, an invalid value is set in items for which settings are not changed, such that it is unnecessary to hold unnecessary information with the audio device control application. Further, the reply of all settings and the current status is executed through one command at once, thereby reducing the HDMI-CEC traffic.

When only the sound quality of the center speaker is set to +4 dB and the sound qualities of the other speakers are not changed, the television receiver 200 transmits the command as described above. However, when the sound qualities may not be set (e.g., when the speakers to be set are not temporarily used) due to a state of a receiving side (i.e. the AV amplifier 300), an invalid value (0x80) is set in items that may not be set and a command is transmitted from the AV amplifier 300 to the television receiver 200 to notify of the status.

While in the data structure example shown in FIG. 34, each byte has a signed value, the present invention is not limited to such an example and each byte may have an unsigned value. FIG. 35 illustrates another example of the data structure of the command exchanged between the television receiver 200 and the AV amplifier 300.

The data structure example shown in FIG. 35 shows that the command is a command to request the current status from the television receiver 200 to the AV amplifier 300 when the opecode defined in the 6th and 7th bytes of the command is "0x0003," a command to notify a current status from the AV amplifier 300 to the television receiver 200 when the opecode is "0x0004," and a setting command from the television receiver 200 to the AV amplifier 300 when the opecode is "0x0005."

Data of each byte of the status notification command from the AV amplifier 300 to the television receiver 200 and the status setting command from the television receiver 200 to the AV amplifier 300 shown in FIG. 35 will be described. The 8th byte relates to a given set value a, the 9th byte relates to a given set value b, and the 10th byte relates to a given set value c. The 11th byte and subsequent bytes are not used in such commands.

In the present embodiment, each byte shown in FIG. 35 is an unsigned value. For example, the set value a ranges from 0 to 3, the set value b ranges from 0 to 5, and the set value c ranges from 0 to 2. For items having no function and items for which settings are not changed, an invalid value (e.g., "0xFF") is set in corresponding bytes for transmission.

When the AV amplifier 300 notifies, using a command, the television receiver 200, for example, that the set value a is 1, the set value b is 3, and the set value c has no function, the AV amplifier 300 transmits the command as "0x00 0x04 0x01 0x03 0xFF" in order from the 8th byte.

When the television receiver 200 notifies, using a command, the AV amplifier 300, for example, that the set value a is set to 2, the set value b is set to 1, and the set value c is not set because of having no function, the television receiver 200 transmits the command as "0x00 0x05 0x02 0x01 0xFF" in order from the 8th byte.

When the television receiver 200 notifies, using a command, the AV amplifier 300, for example, that only the set value b is set to 1, the set value a is not changed, and the set value c is not set because of having no function, the television receiver 200 transmits the command as "0x00 0x05 0xFF 0x01 0xFF" in order from the 8th byte. Thus, the invalid value is set even in items for which the settings are not changed, such that it is unnecessary to hold unnecessary information with the audio device control application. It is also possible to reduce HDMI-CEC traffic by executing the reply of all settings and the current status with one command at once.

When only the set value b is set to 1 and the other set values are not changed, the television receiver 200 transmits the command as described above. However, when the values may not be set due to a state of a receiving side (i.e. the AV amplifier 300) (e.g., when the speaker to be set is not temporarily used), the invalid value (0xFF) is set in items that may not be set and a command is transmitted from the AV amplifier 300 to the television receiver 200 to notify of the current status. Specifically, the AV amplifier 300 transmits the command as "0x00 0x04 0x02 0xFF 0xFF" in order from the 8th byte.

When the television receiver 200 transmits a command to set the value out of a prescribed range, the AV amplifier 300 sets the invalid value (0xFF) in the items that may not be set and transmits the command to the television receiver 200 to notify of the current status. For example, when the television receiver 200 notifies, using a command, the AV amplifier 300, for example, that only the set value b is set to 6 (value out of the range), the set value a is not changed, and the set value c is not set because of having no function, the television receiver 200 transmits the command as "0x00 0x05 0xFF 0x06 0xFF" in order from the 8th byte. However, since the set value b ranges only from 0 to 5, the setting transmitted from the television receiver 200 may not be accepted. In this case, the AV amplifier 300 transmits the command as "0x00 0x04 0x02 0xFF 0xFF" in order from the 8th byte.

7. Conclusion

As described above, according to the embodiment of the present invention, the television receiver 200 downloads an application for controlling a setting or an operation of the AV amplifier 300 from the application server 12 and executes the application. The television receiver 200 can display a screen for controlling the setting or operation of the AV amplifier 300 on the display panel 216 by executing the application. The user can view the screen displayed on the display panel 216 and manipulate the remote controller 800 of the television receiver 200 to power the AV amplifier 300 off, change the audio input source, and change the setting of the sound field and the sound quality by using a command system standardized as HDMI-CEC.

Since the AV amplifier 300 is manipulated by the GUI displayed on the television receiver 200, it is unnecessary to prepare hardware for causing the GUI to be displayed on the AV amplifier 300. It is also possible to provide a high-definition user interface corresponding to full HD resolution or a rich interface using pictures to a user. Furthermore, mounting the interface is easier than assembling the GUI into the television receiver 200. If the application is defective or the number of corresponding models of the AV amplifier 300 that can be controlled using the application increases, assembling the GUI into the television receiver 200 requires update of firmware of the television receiver 200, whereas modification of the application of the application server 12 overcomes the defect and allows for an increase of the number of the corresponding models.

In a related art, when an application for controlling the AV amplifier 300 from the television receiver 200 is installed in the television receiver 200, it is necessary to perform development of the television receiver 200 together with development of the AV amplifier 300. However, use of the scheme of downloading the application from the application server 12 as in the present embodiment enables development of the application to be performed independently from the development of the television receiver 200.

When the AV amplifier 300 is connected to the television receiver 200 via the HDMI cable 701, if an application for controlling the AV amplifier 300 is not registered in the television receiver 200, the television receiver 200 acquires information of an application (widget) to which the AV amplifier 300 corresponds from the AV amplifier 300 and then acquires the application (widget) from the application server 12 based on the information. Accordingly, it is possible for the television receiver 200 to control the AV amplifier 300 using an appropriate application (widget) according to the AV amplifier 300 connected to the television receiver 200.

The AV amplifier 300 may be set to voluntarily generate its status at a timing when the television receiver 200 initiates the execution of the audio device control application, and not to voluntarily generate the status at a time when the execution is terminated. Accordingly, it is possible to suppress traffic increase between the television receiver 200 and the AV amplifier 300 and reduce a traffic load.

While the case in which the AV amplifier 300 connected to the television receiver 200 via the HDMI cable 701 is controlled using the application run in the television receiver 200 has been described by way of example in the above-described embodiment, the present invention is not limited to such an example. For example, according to the configuration of the AV system 1 shown in FIG. 1, the present invention may also be applied to the case in which the television receiver 200 controls the video recorder 400 or 600 and the video player 500 using the application run in the television receiver 200. Further, it is understood that a device as a control source is not limited to the television receiver 200.

The operation of the television receiver 200 and the operation of the AV amplifier 300 described above may be processed using hardware or software. Further, a program executed by a computer may be a program in which processes are sequentially performed according to the sequence described in this disclosure, or a program in which processes are performed in parallel or at a necessary timing, such as a time when a call is performed.

While the preferred embodiments of the present invention have been described in detail with reference to the accompanying drawings, the present invention is not limited to such embodiments. It should be understood by those skilled in the art that various modifications, combinations, sub-combinations and alterations may occur depending on design requirements and other factors insofar as they are within the scope of the appended claims or the equivalents thereof.

For example, while, in the above-described embodiment, the television receiver 200 properly downloads the application from the application server 12 and executes the downloaded application, the present invention is not limited to such an example. For example, when the application is terminated, the television receiver 200 may operate to delete a file downloaded from the application server 12 upon application execution and held in the flash ROM 232. It is possible to effectively use the capacity of the flash ROM 232 by deleting the file held in the flash ROM 232 and also download up-to-date files from the application server 12.

What is claimed is:

1. A device control apparatus, comprising:
    a transmission signal input/output unit for receiving a signal including a control signal for controlling an internal state from another device connected to the transmission signal input/output unit or for outputting the signal to the another device;
    an application acquisition unit for properly accessing an application server over a network and properly acquiring an application from the application server;

a display control unit for controlling, on a first region of a display screen, a display based on the application acquired from the application server by the application acquisition unit; and an operation control unit for executing the application acquired from the application server by the application acquisition unit to control an operation of the another device connected to the transmission signal input/output unit, wherein the operation control unit permits the another device to transmit its status upon initiation of execution of the application acquired by the application acquisition unit, and prohibits the another device from transmitting the status upon termination of the application execution, and wherein the another device connected to the transmission signal input/output unit is an audio amplification device, the application acquired from the application server is configured to be executed in a state in which a video is displayed on a second region of the display screen while the display based on the application acquired from the application server is displayed on the first region of the display screen, and the video is associated with an audio input source of the audio amplification device, and wherein the operation control unit executes the application acquired from the application server by the application acquisition unit to change a sound field of the audio amplification device.

2. The device control apparatus according to claim 1, wherein the operation control unit sets a plurality of parameters of the another device connected to the transmission signal input/output unit by means of one command transmission.

3. The device control apparatus according to claim 2, wherein the command transmitted by the operation control unit is a vendor specific command of HDMI-CEC.

4. The device control apparatus according to claim 2, wherein the operation control unit sets a real number in a corresponding field of the command when the parameters of the another device connected to the transmission signal input/output unit are changed, and sets a given invalid value in the field of the command when the parameters are not changed.

5. The device control apparatus according to claim 1, wherein the operation control unit executes the application acquired by the application acquisition unit and powers the another device connected to the transmission signal input/output unit off.

6. The device control apparatus according to claim 1, wherein at least one speaker is connected to the audio amplification device, and the operation control unit executes the application acquired from the application server by the application acquisition unit to change a sound output level of the speaker connected to the audio amplification device.

7. The device control apparatus according to claim 1, wherein the operation control unit executes the application acquired from the application server by the application acquisition unit to change an audio input source of the audio amplification device.

8. The device control apparatus according to claim 1, further comprising an application discarding unit for discarding the application acquired by the application acquisition unit when the operation control unit terminates the execution of the application.

9. A device control method, comprising:

receiving a signal including a control signal for controlling an internal state from another device or outputting the signal to the another device;

properly accessing an application server over a network and properly acquiring the application from the application server;

controlling, on a first region of a display screen, a display based on an application acquired from the application server in the application acquisition step;

executing the application acquired from the application server in the application acquisition step to control an operation of the another device;

permitting the another device to transmit its status upon initiation of the execution of the application acquired by the application acquisition unit; and prohibiting the another device from transmitting the status upon termination of the application execution, wherein the another device is an audio amplification device, the application acquired from the application server is configured to be executed in a state in which a video is displayed on a second region of the display screen while the display based on the application acquired from the application server is displayed on the first region of the display screen, and the video is associated with an audio input source of the audio amplification device, and wherein executing further includes executing the application acquired from the application server to change a sound field of the audio amplification device.

10. The device control method according to claim 9, wherein the executing step includes executing the application acquired from the application server to change a sound field of the audio amplification device.

11. The device control method according to claim 9, wherein at least one speaker is connected to the audio amplification device, and the executing step includes executing the application acquired from the application server to change a sound output level of the speaker connected to the audio amplification device.

12. The device control method according to claim 9, wherein the executing step includes executing the application acquired from the application server to change an audio input source of the audio amplification device.

13. A non-transitory computer-readable medium having recorded therein a computer program for causing a computer to execute a device control method, comprising:

receiving a signal including a control signal for controlling an internal state from another device or outputting the signal to the another device;

properly accessing an application server over a network and properly acquiring the application from the application server;

controlling, on a first region of a display screen, a display based on an application acquired from the application server in the application acquisition step;

executing the application acquired from the application server in the application acquisition step to control an operation of the another device;

permitting the another device to transmit its status upon initiation of the execution of the application acquired by the application acquisition unit; and prohibiting the another device from transmitting the status upon termination of the application execution, wherein the another device is an audio amplification device, the application acquired from the application server is configured to be executed in a state in which a video is displayed on a second region of the display screen while the display based on the application acquired from the application server is displayed on the first region of the display screen, and the video is associated with an audio input source of the audio amplification device, and wherein the executing step further includes executing the application acquired from the application server to change an audio input source of the audio amplification device.

14. The non-transitory computer-readable medium according to claim 13, wherein the executing step includes executing the application acquired from the application server to change a sound field of the audio amplification device.

15. The non-transitory computer-readable medium according to claim 13, wherein at least one speaker is connected to the audio amplification device, and the executing step includes executing the application acquired from the application server to change a sound output level of the speaker connected to the audio amplification device.

* * * * *